United States Patent
Shimbara et al.

[11] Patent Number: 5,925,080
[45] Date of Patent: Jul. 20, 1999

[54] AUTOMATIC GUIDED VEHICLE CONTROL SYSTEM

[75] Inventors: Yoshimi Shimbara; Koji Teramoto; Koichi Moriyama; Hiroyuki Morimoto, all of Hiroshima, Japan

[73] Assignee: Mazda Motor Corporation, Hiroshima, Japan

[21] Appl. No.: 08/834,824

[22] Filed: Mar. 31, 1997

[30] Foreign Application Priority Data

Mar. 29, 1996 [JP] Japan ................................. 8-134486
Mar. 29, 1996 [JP] Japan ................................. 8-134487

[51] Int. Cl.[6] .............................. G06G 7/76; B64C 13/18
[52] U.S. Cl. ........................... 701/23; 701/25; 180/168; 318/587
[58] Field of Search ................................ 701/23, 24, 25, 701/26, 41; 180/168, 167, 169; 318/587, 618, 652; 706/900, 905, 20, 23, 21

[56] References Cited

U.S. PATENT DOCUMENTS

| | | |
|---|---|---|
| 4,530,057 | 7/1985 | Ahlbom ................................. 701/23 |
| 4,600,999 | 7/1986 | Ito et al. ................................. 701/25 |
| 4,665,489 | 5/1987 | Suzuki et al. ........................... 701/24 |
| 4,939,650 | 7/1990 | Nishikawa .............................. 701/26 |
| 5,218,542 | 6/1993 | Endo et al. .............................. 701/27 |
| 5,377,106 | 12/1994 | Drunk et al. ............................ 701/25 |
| 5,471,385 | 11/1995 | Suzuki et al. ........................... 701/23 |
| 5,483,453 | 1/1996 | Uemura et al. ......................... 701/23 |
| 5,764,014 | 6/1998 | Jakeway et al. ........................ 701/23 |
| 5,765,116 | 6/1998 | Wilson-Jones et al. ................. 701/41 |

FOREIGN PATENT DOCUMENTS 62-78613  4/1987  Japan.
6-259134  9/1994  Japan.

Primary Examiner—Jacques H. Louis-Jacques
Attorney, Agent, or Firm—Sixbey, Friedman, Leedom & Ferguson; Donald R. Studebaker

[57] ABSTRACT

A automatic guided vehicle travels on a prearranged travel path established by a path guide and detects lateral deviation of the vehicle from a path guide to control the direction of travel of the vehicle by steering the vehicle according to a prescribed relationship between steering angle and lateral deviation which is installed in the form of ruling maps in the vehicle.

20 Claims, 22 Drawing Sheets

MAP M6

MAP M7

AUTOMATIC GUIDED VEHICLE CONTROL SYSTEM

BACKGROUND OF THE INVENTION

1. Field of the Invention

This invention relates to a drive control system for controlling a automatic guided vehicle on a prearranged path established by a guide means.

2. Description of Related Art

Some types of automatic guided vehicles are equipped with optical sensors for detecting path instruction means by which a prearranged travel path is established on, for example, a floor of a factory. Such a automatic guided vehicle is equipped with a steering control system which selectively use optimum steering gains according to travel speeds in order the automatic guided vehicle to adapt steering characteristics different between forward travel and backward travel. Such a automatic guided vehicle is known from, for example, Japanese Patent Publication No. 62-78613.

While this prior art automatic guided vehicle is advantageous in that selection of steering gains makes over-steering and under-steering as small as possible, it is hard to change steering control characteristics after the loop gain has once been established.

Japanese Unexamined Patent Publication No. 6-259134 describes an autonomous travel vehicle equipped with drive control systems which include a bearing sensor for detecting an absolute location and bearing angle of the vehicle, a direction encoder and a speed encoder. The automonous travel control system performs an operation to estimate an angular speed based on output values from these encoders and makes a comparison of the estimated angular speed with an absolute angular speed. The absolute angular speed is employed to control the vehicle when the difference between these angular speeds is within specified limits, and the estimated angular speed is employed to control the vehicle when the difference between these angular speeds is beyond the specified limits.

In the prior art autonomous travel control changes the speed of vehicle stepwise, a stepwise change of the speed of autonomous travel vehicle causes lateral or right and left sway motion of the vehicle due to a relatively long time spent until electric circuits of the autonomous travel control system becomes stable in operation.

SUMMARY OF THE INVENTION

It is another object of the invention to provide a automatic guided vehicle which has a high flexibility of steering characteristics.

It is an object of the present invention to provide a automatic guided vehicle which has a high stable drivability.

The foregoing objects of the invention are achieved by providing a drive control system for controlling a automatic guided vehicle which is guided by a path guide means to travel on a prearranged path established by the path guide means. The automatic guided vehicle control system controls a steering means to steer the automatic guided vehicle by a prescribed steering relationship, or preferably different prescribed steering relationships, between controlled steering variable and lateral deviation of the vehicle from the path guide means which is detected by a sensor means installed on the automatic guided vehicle. The prescribed steering relationships are stored in the form of maps in a memory and are selectively read out according to travel speeds of the vehicle.

The automatic guided vehicle control system includes a travel instruction means comprising a number of travel instructions disposed along the path guide means to provide travel instructions relating at least to travel speeds of the automatic guided vehicle and another sensor installed on the automatic guided vehicle to read in the travel instructions. The control system selectively read out the maps of the maps according to travel speeds and determine a controlled variable for steering according to a lateral deviation of the automatic guided vehicle. There may be prepared various maps for steering control adapted to acceleration, deceleration, forward travel, backward travel, high speed travel, moderate speed travel, low speed travel, etc. The steering means may comprise a steering disk supported for rotation by the automatic guided vehicle, wheel drive means, such as wheel drive motors, secured to the steering disk for independently driving right and left drive wheels. The wheel drive motors are controlled to drive the drive wheels at different speeds according to a lateral deviation of the automatic guided vehicle from the path guide means, changing the travel direction of the automatic guided vehicle. Alternatively, the steering means may comprise a steering disk supported for rotation by the automatic guided vehicle, a wheel drive means, such as a wheel drive motor, installed on the steering disk for driving a single drive wheel, and a steering disk drive motor secured to the automatic guided vehicle for driving the steering disk through an angle according to a lateral deviation of the automatic guided vehicle from the path guide means, changing the travel direction of the automatic guided vehicle.

According to another aspect of the invention, the automatic guided vehicle control system changes a control parameter for the drive motors so as to gradually change a travel speed of the automatic guided vehicle to the instructed travel speed. The automatic guided vehicle control means may have a dead zone for a specified range of lateral deviations. Specifically, the automatic guided vehicle control system includes a proportional control circuit for providing a controlled variable proportional to a target vehicle travel speed, a feedback control circuit which detects a rotational speed of the drive motor and provides a feedback signal for the proportional control circuit, and a feedforward control circuit which is disposed between an output end of the steering control circuit and a point between an output end of the proportional control circuit and an input end of the motor drive circuit for compensating disturbance.

Changing the drive motor control parameter eliminates or greatly reduces lateral or right and left sway motion of the automatic guided vehicle while the automatic guided vehicle changes its travel speed. The provision of dead zone for a specified range of lateral deviations prevents the steering mechanism from working at frequent intervals and consequently provides an increase in durability and life of the steering mechanism.

The feedforward control, which excludes the influence of disturbance between the proportional control circuit and motor drive circuit, preventing the automatic guided vehicle from encountering such frequent lateral sway motion as to occurs in particular, when the travel speed changes stepwise or immediately after a travel on a long slope until the control system becomes stable and improving the responsiveness of drive control to speed changes.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE PREFERRED EMBODIMENTS

Figure 1:
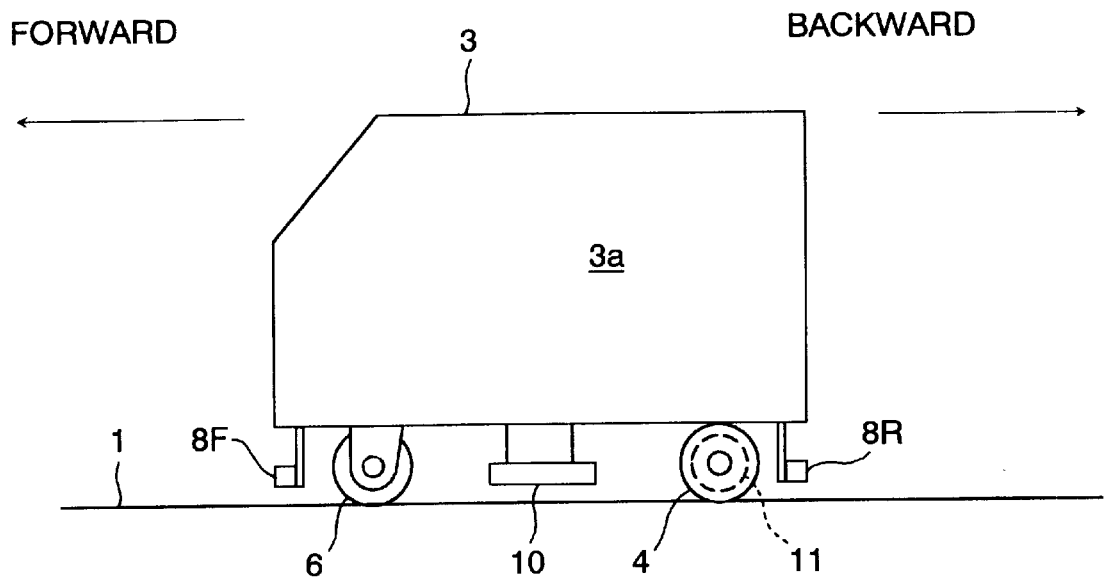
FIG. 1 is a side view of an automatic guided vehicle equipped with a drive control system of the invention.
Figure 2:
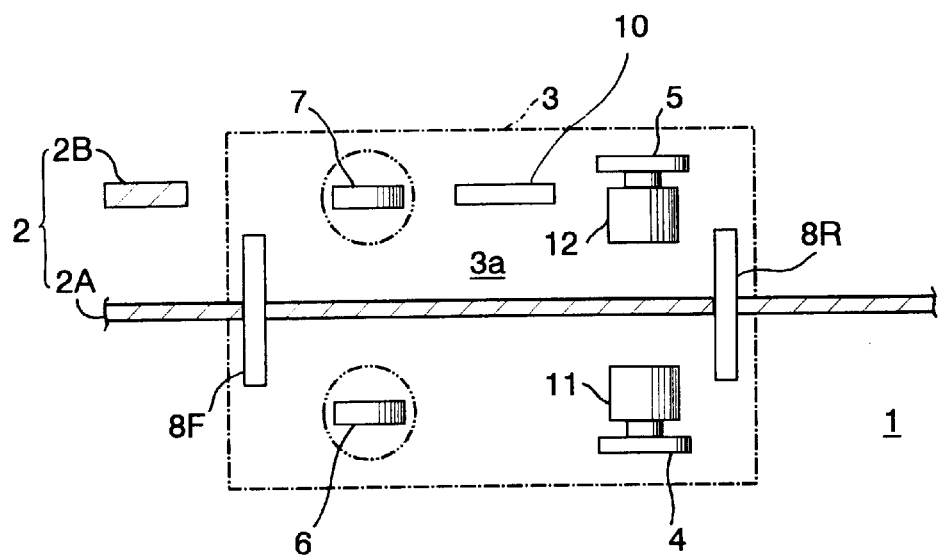
FIG. 2 is a bottom view of the automatic guided vehicle of FIG. 1.

Referring to the drawings in detail, in particular, to FIGS. 1 and 2, an automatic guided vehicle 3 travels on a floor 1 along a prearranged travel path which is established by a guide means 2, such as a magnetic guide tape or board or an optical guide tape or board, laid on the floor 1. The guide means 2 comprises a path guide tape 2A and a plurality of travel instruction tape 2B. The path guide tape 2A attached to the floor 1 defines a prearranged travel path on which the automatic guided vehicle 3 travels. The travel instruction tape 2B provides travel information and instructions including vehicle speeds and acceleration and deceleration instructions at designated locations along the travel path. The automatic guided vehicle 3 is equipped with a reversible type of electric drive motors 11 and 12 secured to the under side of a vehicle body 3a. The drive motor 11 is directly connected to a rear right drive wheel 4, and the drive motor 12 is directly connected to a rear left drive wheel 5. The automatic guided vehicle 3 has a pair of driven wheels, namely a front right wheel 6 and a front left wheel 7, supported by the vehicle body a. Each driven wheel 6, 7 may comprise a caster connected directly to the vehicle body a or a wheel connected to the vehicle body a by means of a swivel. The automatic guided vehicle 3 has front and rear path guide sensors 8F and 8R and a travel instruction sensor 10, all of which are sensitive to the guide means 2. The guide sensor 8F, 8R has an elongated shape extending in a transverse direction of the vehicle body a and generally oriented perpendicularly to the travel direction of the automatic guided vehicle 3. The travel instruction sensor 10 has an elongated shape extending in a longitudinal direction of the vehicle body a and generally oriented in parallel to the travel direction of the automatic guided vehicle 3. These sensors 8F, 8R and 10 may be magnetic sensors if a magnetic guide tape is employed as the guide means 2 or may be an optical sensor if an optical guide tape is employed as the guide means 2. The path guide sensors 8F and 8R may be of a photoelectric type if an optically reflective member or material is employed as the guide means 2. For example, if a white paint is applied to the floor 1 as the path guide 2A, the path guide sensor 8F and 8F may comprises a row of photocell elements. If an electric conductor wire which is able to generate a magnetic field with an induced current, the path guide sensor 8F and 8F may comprise a row of cylindrical probe coils.

Figure 3:
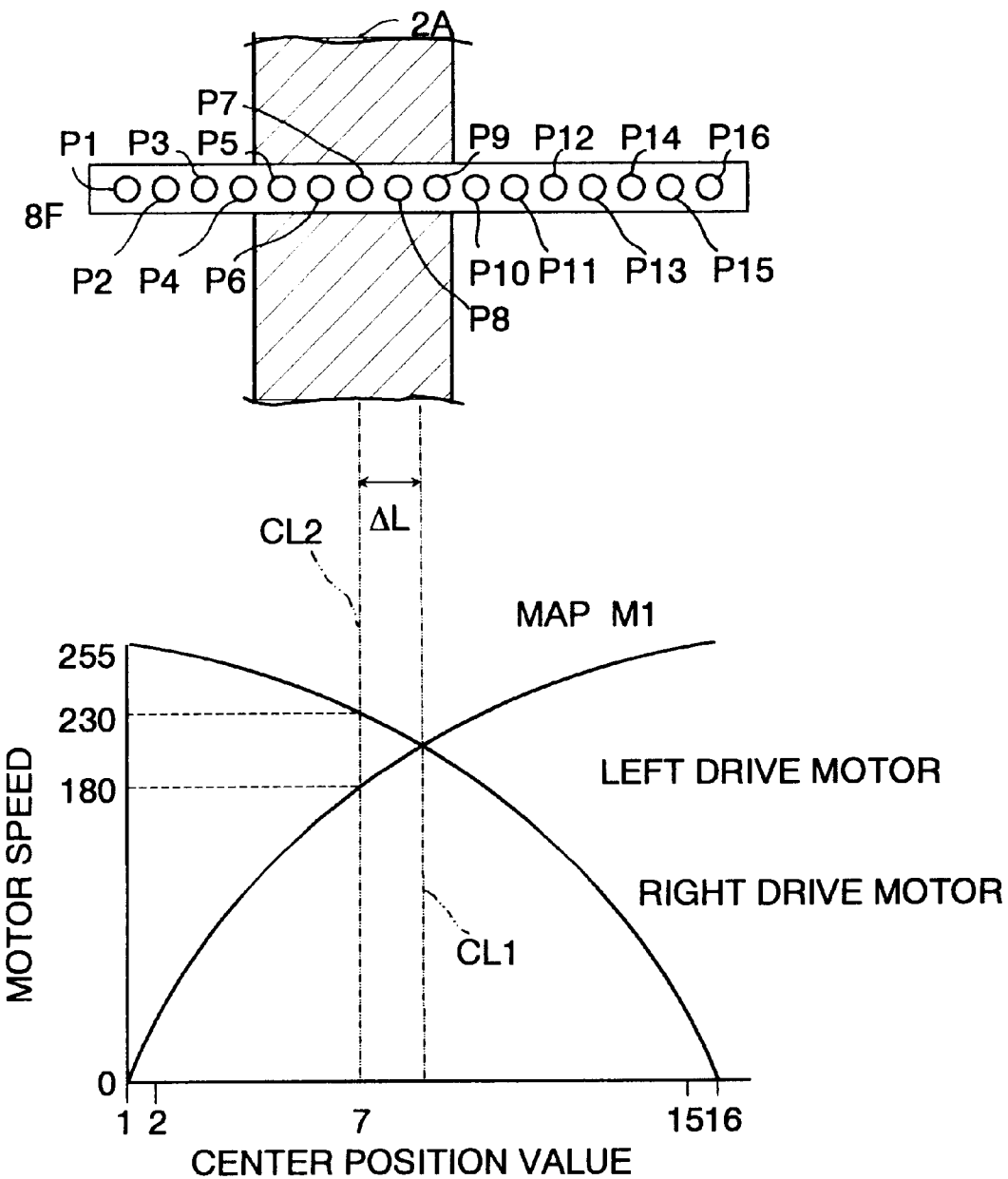
FIG. 3 is an explanatory illustration showing a relationship between lateral deviations of the automatic guided vehicle and a control rule.

As shown in FIG. 3, the front path guide sensor 8F has a row of sixteen sensor elements C1–C16 arranged at regular intervals. Sensor elements over the path guide tape 2A provide a specific level of electric output. If a magnetic tape is employed as the guide means 2, a magnetic hole element may preferably be employed as the sensor element P1–P16. In this instance, the path guide tape 2A has a width sensed by at least five out of the sixteen sensor elements P1–P16 (numbers following label P indicate positions of the sensor elements) which are given specific location numbers from 1 to 16. According to positions of the sensor elements which provide the specific level of output, it is found how far the automatic guided vehicle 3 has shifted laterally from the path guide tape 2A. The drive motors 4 and 5, and hence the right and left drive wheels 11 and 12, are controlled through a drive control system (which will be described later) to be differentially driven according to the shifted lateral distance, i.e. the lateral deviation, to correct the travel path or the traveling direction of the automatic guided vehicle 3.

Figure 4:
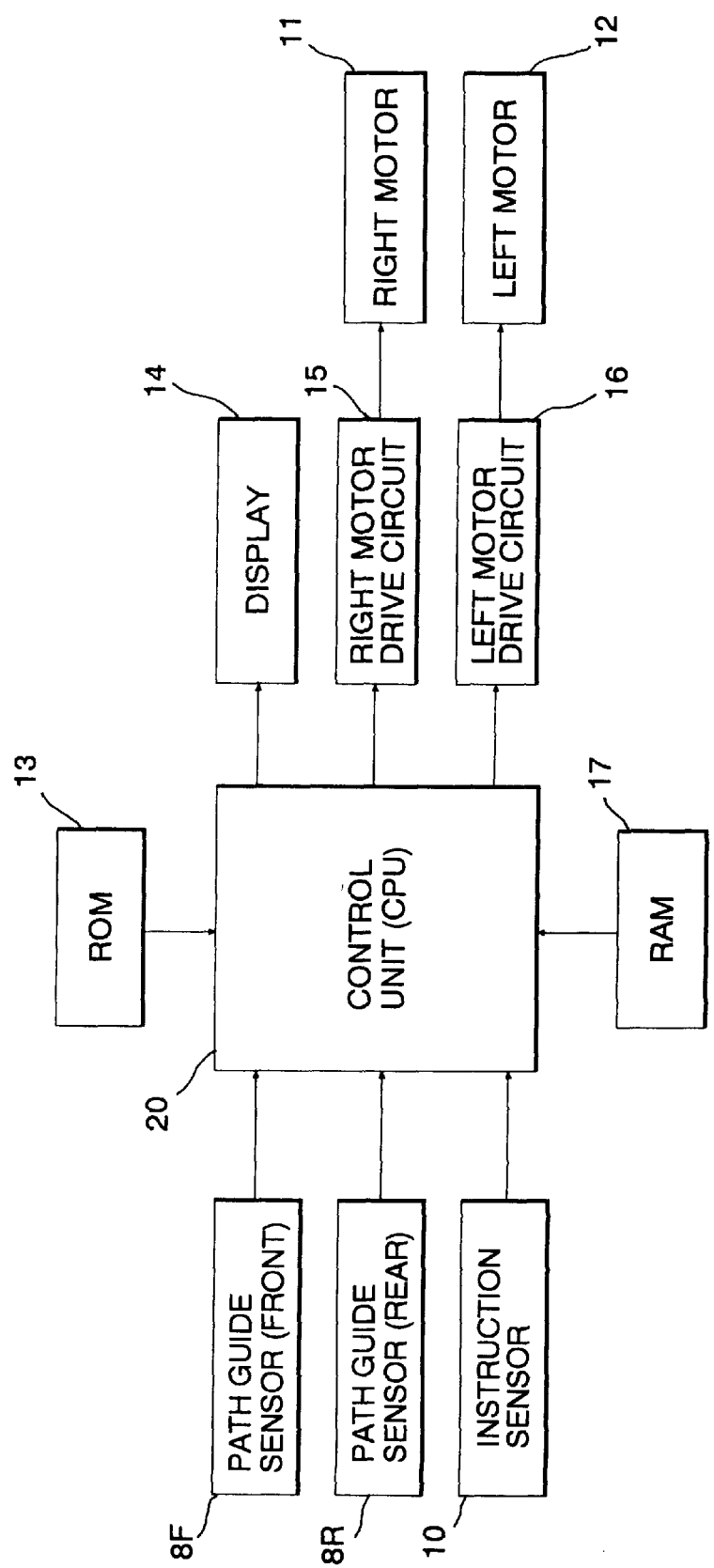
FIG. 4 is a block diagram of a control circuit of a drive control system in accordance with a specific embodiment of the invention.

FIG. 4 shows the automatic guided vehicle drive control system in block diagram. The drive control system includes a control unit 20, such as comprising a central processing unit (CPU), which receives signals from the front and rear path guide sensors 8F and 8R and the travel instruction sensor 10. Read only memory (ROM) 13 stores control programs which are read out to control operation display unit 14, and motor drive control circuits 15 and 16 according to the signals. Random access memory (RAM) 17 stores various data of working area, control parameters, and drive ruling maps, for example a drive ruling map M1 such as shown in FIG. 3. The operation display unit 14 displays that whether a start instruction or a stop instruction has been provided for the automatic guided vehicle 3. The motor drive control circuits 15 and 16 control operation of the right and left drive motors 11 and 12, respectively. The drive ruling map M1 provides a prescribed relationship between rotational speeds of the drive motors 11 and 12 and lateral deviation as a control rule governing travel of the automatic guided vehicle 3.

The drive ruling map M1 shown in FIG. 3 is stored in RAM 17 and presents a drive speed control rule applied to drive motor speed control, i.e. control of rotational speeds of the right and left drive motors 11 and 12, with respect to lateral deviation of the automatic guided vehicle 3 detected by the front guide path sensor 8F. A chained line presents rotational speed ruling line for the right drive motor 11, and a solid line presents rotational speed ruling line for the left drive motor 12. In this instance, each drive motor 11, 12 has the highest rated rotational speed of level 255. In this drive ruling map M1, CL1 indicates the center of the automatic guided vehicle 3 as viewed in the transverse direction, and CL2 indicates the center of the path guide tape 2A as viewed in the transverse direction. When the automatic guided vehicle 3 travels with its center CL1 in spatial alignment with the center CL2 of the path guide tape 2A, the lateral deviation is zero. On the other hand, when the front path guide sensor 8F (ie. the automatic guided vehicle 3) shifts right or left by a lateral deviation ΔL, the centers CL1 and CL2 depart from each other by the lateral deviation ΔL. In order to bring the automatic guided vehicle 3 back to the prearranged travel path, the automatic guided vehicle 3 must be shifted back to bring the vehicle center CL1 into spatial alignment with the transverse center CL2 of the path guide tape 2A. In the illustrated example, the automatic guided vehicle 3 has shifted laterally from the prearranged travel path by a distance ΔL (a lateral deviation) and the front path guide sensor 8F provides output signals from the sixth to ninth sensor elements P5–P9. The control unit 20 calculates a center position value relating to the transverse center CL2 of the path guide tape 2A based on the center position of the sensor elements P5–P9 to find the lateral distance ΔL of the automatic guided vehicle 3 from the path guide tape 2A and reads the drive ruling map M1 to determine motor speeds at which the right and left drive motors 11 and 12, and hence the right and left drive wheels 4 and 5, must rotate to correct the lateral deviation ΔL of the automatic guided vehicle 3. Specifically, when the automatic guided vehicle 3 has shifted right by a lateral deviation ΔL as shown in FIG. 3, the rotational speeds of the right and left drive motors 11 and 12 are increasingly and decreasingly changed to rotational speed levels 230 and 180, respectively, to shift back the automatic guided vehicle 3 left toward the center of the path guide tape 2A. In this instance, available motor speeds in rotation from 0 to 3,000 rpm. are divided into 235 levels or steps of motor speeds. In this way, the automatic guided vehicle 3 is steered according to the rotational speed difference between the right and left drive wheels 4 and 5.

While the automatic guided vehicle 3 is traveling straight forward, the lateral deviation ΔL is given by a center position value of the path guide sensor 8F in relation to the transverse center of the path guide tape CL2. The control unit 20 provides for the right and left motor drive control circuits 15 and 16 drive control signals indicating rotational speed levels corresponding to the center position value. For example, in the event where the fifth to ninth sensor elements P5–P9 detect the path guide tape 2A, the center position value is given as an arithmetic mean value of their position numbers, namely five through nine which is seven, and the control unit 20 provides for the right and left motor drive control circuits 15 and 16 signals of rotational speed levels of 255 and 180, respectively. When the travel instruction sensor 10 detects a right turn instruction from a travel instruction tape 2B, the center position value is calculated as an arithmetic mean value of a specified number of outputting sensor elements from the left. Similarly, when the travel instruction sensor 10 detects a left turn instruction from a travel instruction tape 2B, the center position value is calculated as an arithmetic mean value of a specified number of outputting sensor elements from the right. The disregard for signals from the remaining outputting sensor elements is made in order to prevent deviation of the automatic guided vehicle 3 out of the prearranged travel path. The self-drive drive control by the utilization of drive ruling map M1 allocated in RAM 17 permits easy correction of drive and steering rule or a change of travel and steering rule according to types of automatic guided vehicle or weight of automatic guided vehicles. Further, the utilization of travel ruling map enables to directly read control variables for drive and steering control of the automatic guided vehicle without performing any computation, the control unit 20 can save control time and reduces computing load.

Figure 5:
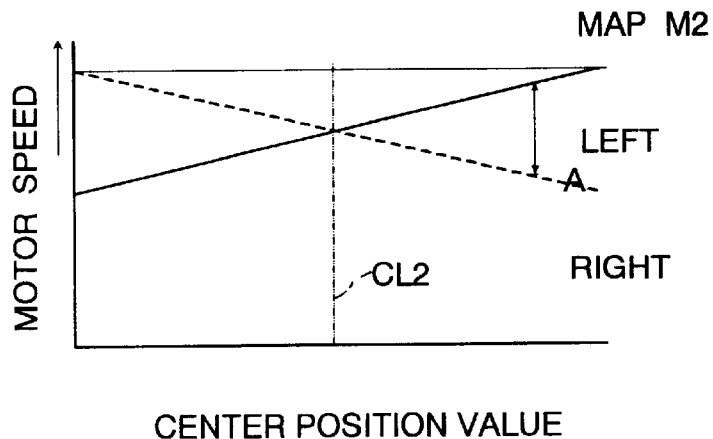
FIG. 5 is a drive ruling map for high speed travel used in the automatic guided vehicle control system shown in FIG. 4.
Figure 6:
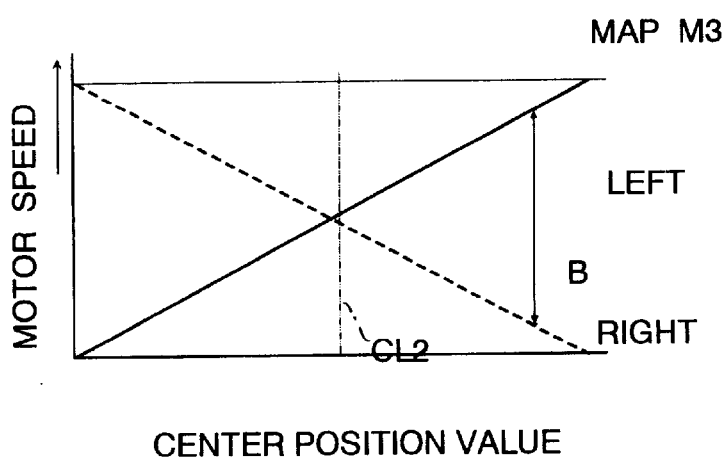
FIG. 6 is a drive ruling map for moderate speed travel used in the automatic guided vehicle control system shown in FIG. 4.
Figure 7:
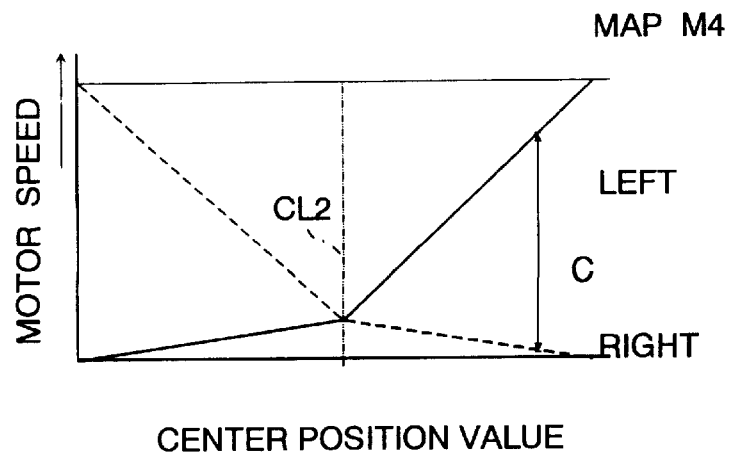
FIG. 7 is a drive ruling map for low speed travel used in the automatic guided vehicle control system shown in FIG. 4.

FIGS. 5 to 7 show drive ruling maps M2, M3 and M4 provided respectively for high speed traveling, moderate speed traveling and low speed traveling, which are practically used in place of the drive ruling map M1. These drive ruling maps M2–M3 prescribe rotational speeds of the right and left drive motors 11 and 12 as controlled variables with respect to lateral deviation and selectively used according to vehicle travel speeds. The high speed drive ruling map M2 is selected when the automatic guided vehicle travels at a speed, for example, between approximately 30 to 60 m/min, the moderate speed drive ruling map M3 is selected when the automatic guided vehicle travels at a speed, for example, between approximately 15 to 30 m/min, and the low speed drive ruling map M4 is selected when the automatic guided vehicle travels at a speed, for example, between approximately 5 to 15 m/min. In each drive ruling map M2, M3, M4, a chained line presents rotational speed ruling line for the right drive motor 11, and a solid line presents rotational speed ruling line for the left drive motor 12. As understood in FIGS. 5 to 7, the drive ruling maps M1, M2 and M3 provide rotational speed differences A, B and C between the right and left drive motors 11 and 12, respectively, for each specific lateral deviation. In other words, the rotational speed difference is changed to become smaller as the automatic guided vehicle 3 increases its speed stepwise for the reason for guaranteeing cornering stability of the automatic guided vehicle 3.

Figure 8:
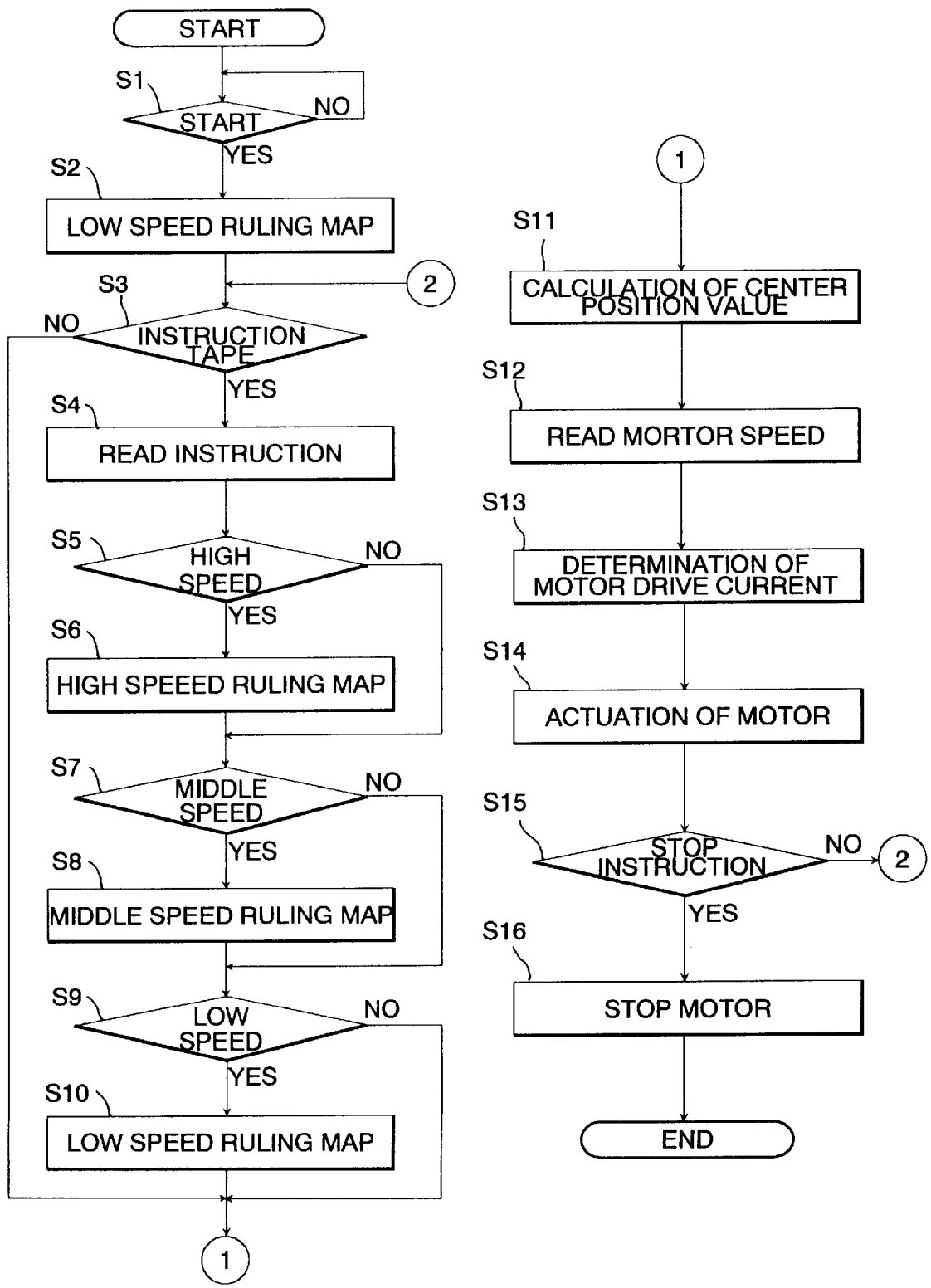
FIG. 8, comprising of FIGS. 8A and 8B, is a flowchart illustrating the drive control sequence routine for the automatic guided vehicle.

FIG. 8 is a flowchart illustrating the automatic guided vehicle drive control sequence routine. When the flowchart logic commences and control directly passes to a decision at step S1 as to whether or not the automatic guided vehicle 3 is demanded to start. This decision is repeated until the automatic guided vehicle 3 starts. When it is immediately after starting, the low speed drive ruling map M4 is retrieved and rotational speeds for the right and left drive motors 11 and 12 are read at step S2. A determination is subsequently made at step S3 as to whether or not the travel instruction sensor 10 detects any one of the travel instruction tapes 2B. When the travel instruction sensor 10 detects a travel instruction tape 2B and provides an output signal or output signals from the sensor elements, the travel speed instruction of the travel instruction tape 2B is read at step S4. Subsequently, a determination is made based on the travel speed instruction at step S5 as to whether or not the automatic guided vehicle 3 is demanded to travel at a high speed. If the answer is affirmative, the control unit 20 retrieves the high speed drive ruling map M2 from RAM 17 at step S6. Thereafter, or when the answer to the determination made at step S5 is negative, then, a determination is made based on the location instruction at step S7 as to whether or not the automatic guided vehicle 3 is demanded to travel at a moderate speed. If the answer is affirmative, then, the moderate speed drive ruling map M3 is retrieved from RAM 17 at step S8. Thereafter, or when the answer to the determination made at step S6 is negative, then, a determination is further made based on the location instruction at step S9 as to whether or not the automatic guided vehicle 3 is demanded to travel at a low speed. If the answer is affirmative, the low speed drive ruling map M4 is retrieved from RAM 17 at step S10. After the retrieval of the low speed drive ruling map M4, or when the automatic guided vehicle 3 is not demanded to travel at a low speed, or when a signal from the travel instruction sensor 10 is absent, at step S11, the control unit 20 calculates the center position value a relative position based on output signals from the sensor elements P1–P16 of the front path guide sensor 8F to find a lateral deviation of the automatic guided vehicle 3 from the prearranged travel path. Further, the control unit 20 reads rotational speeds for the right and left drive motors 11 and 12 from the retrieved drive ruling map M1, M2 or M3 and performs rotational speed corrections if the travel guide sensor 14 detects a special instruction such as a curve of the travel path from a travel instruction tape 2B at step S12, fixing current values for the drive motors 11 and 12 to rotate at rotational speeds corresponding to speed levels at step S13, and actuates the right and left drive motors 11 and 12 to rotate at the fixed currents, respectively, at step S14, sequentially. When, as a result of the calculation of lateral deviation, it is found that the automatic guided vehicle 3 has shifted from the prearranged travel path, the right and left drive motors 11 and 12 are differentially driven at different rotational speeds read according to the lateral deviation from the retrieved drive ruling map M1, M2 or M3 to correct the lateral deviation and force the automatic guided vehicle 3 toward the prearranged travel path. Thereafter, a determination is made at step S15 as to whether or not the travel instruction sensor 10 detects a travel instruction tape 2B indicating an halt instruction. Unless the control unit 20 reads the signal from the travel instruction tape 2B indicating a halt instruction, it repeats the automatic guided vehicle drive control sequence routine from step S3. On the other hand, when the control unit 20 reads the signal from the travel instruction tape 2B indicating a halt instruction, it stops the operation of the right and left drive motors 11 and 12 and terminates the automatic guided vehicle drive control sequence routine.

The automatic guided vehicle drive control in which three different control rules are selectively used in compliance with vehicle travel speeds and the controlled variable for steering the automatic guided vehicle 3 is changed according to vehicle travel speeds guarantees the automatic guided vehicle 3 to travel with high stability even at high speeds. In addition, the rotational speed difference between the right and left drive motors 11 and 12 which becomes smaller as the automatic guided vehicle 3 increases its travel speed stepwise guarantees the automatic guided vehicle 3 to travel with high stability during cornering. Selection of the drive ruling maps M1, M2 and M3 by use of travel instructions detected by the travel inspection sensor 10 is easy to be performed.

Figure 9:
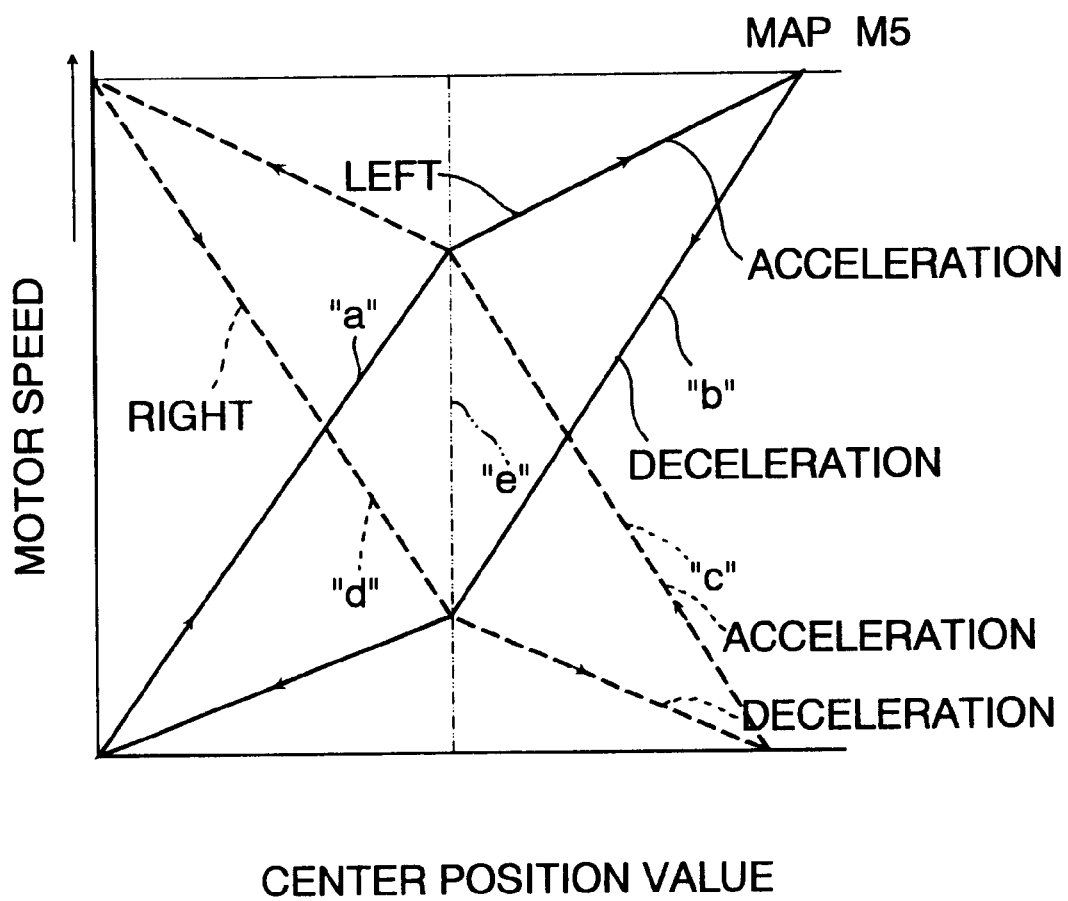
FIG. 9 is a drive ruling map for acceleration and deceleration.

FIG. 9 shows a drive ruling map M4 stored in RAM 17 and applied to the drive motor speed control during acceleration or deceleration. A chained line presents ruling lines for the right drive motor 11, and a solid line presents ruling lines for the left drive motor 12. The ruling lines for acceleration for each of the right and left drive motors 11 and 12 (labeled "c" and "a") prescribe a high controlled speed for the smallest lateral deviation (labeled "e") and lateral deviations in close proximity to the smallest lateral deviation. On the other hand, the ruling lines for deceleration for each of the right and left drive motors 11 and 12 (labeled "d" and "b") prescribe a low controlled speed for the smallest lateral deviation (labeled "e"). That is, the ruling lines for each of the drive motors 11 and 12 are provided with a specified hysteresis between acceleration and deceleration. These ruling lines for the drive motors 11 and 12 may be separately mapped.

Figure 10:
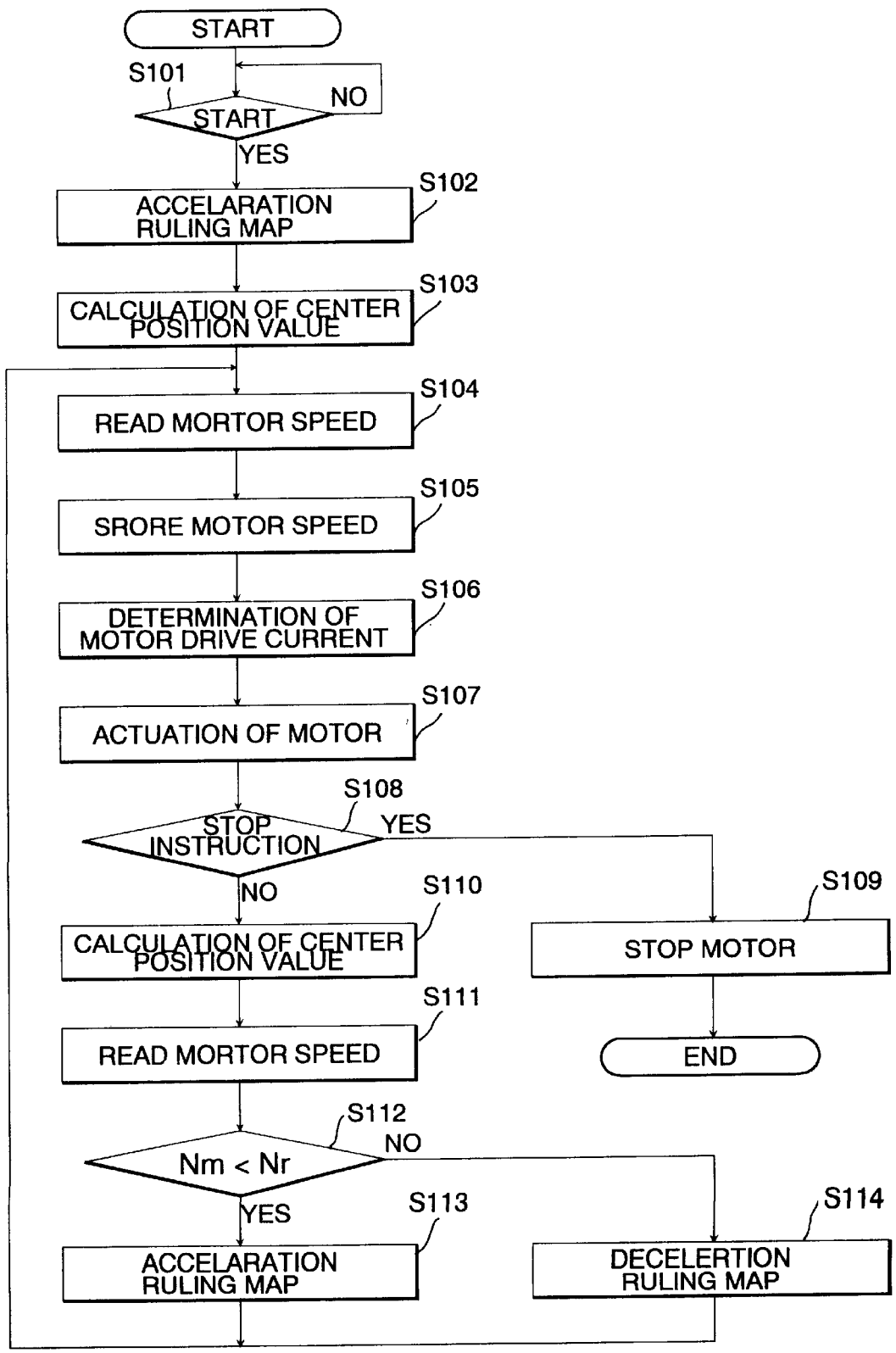
FIG. 10 is a flowchart illustrating the acceleration and deceleration control sequence routine for the automatic guided vehicle.

FIG. 10 is a flowchart illustrating the automatic guided vehicle drive control sequence routine for acceleration and deceleration. When the flowchart logic commences and control directly passes to a decision at step S101 as to whether or not the automatic guided vehicle 3 is demanded to start. This decision is repeated until the automatic guided vehicle 3 starts. When it is immediately after starting, the control unit 20 retrieves the drive ruling map of ruling lines ("c" and "a") for acceleration from RAM 17 at step S102. After the retrieval of the acceleration drive ruling map M5, the center position value of the path guide sensor 8F is subsequently calculated based on output signals from outputting sensor elements of the front path guide sensor 8F to find a lateral deviation of the automatic guided vehicle 3 from the prearranged travel path at step S103. Rotational speeds for the right and left drive motors 11 and 12 are read from the retrieved drive ruling map M5 at step S104, and memorized in RAM 17 at step S105. After fixing current values for the drive motors 11 and 12 to rotate at rotational speeds corresponding to speed levels at step S106, the right and left drive motors 11 and 12 are actuated to rotate at the speeds, respectively, at step S107. Thereafter, a determination is made at step S108 as to whether or not the automatic guided vehicle 3 is demanded to stop. The automatic guided vehicle 3 is demanded when the travel guide sensor 14 detects a stop instruction, when the automatic guided vehicle 3 travels off the prearranged path, or when other sensors provide warnings. If the answer to the determination is affirmative, then, after stopping the right and left drive motors 11 and 12 at step S109, the automatic guided vehicle drive control sequence routine is interrupted. On the other hand, when the answer is negative, a center position value of the automatic guided vehicle 3 with respect to the path guide tape 2A is calculated based on output signals from the outputting sensor elements of the front path guide sensor 8F to find a lateral deviation of the automatic guided vehicle 3 from the prearranged travel path at step S110, and subsequently reads rotational speeds for the right and left drive motors 11 and 12 from the retrieved drive ruling map M5 at step S111.

In order to determine the latest travel instruction indicates acceleration or deceleration a determination is made at step S112 as to whether or not the latest rotational speed, which is stored in RAM 17, is greater than the latest rotational speed obtained at step S111. Subsequently, the control unit 20 reads the acceleration drive ruling map M5 of ruling lines ("a" and "c") at step S113 when acceleration is determined, or the deceleration drive ruling map M5 of ruling lines ("b" and "d") at step S114 when deceleration is determined. The automatic guided vehicle drive control sequence routine is repeated from step S104 until the travel instruction sensor 10 detects a travel instruction tape 2B indicating an halt instruction at step S108.

As apparent, the drive motor 11, 12 is always controlled by use of the most desirable speed ruling lines according to acceleration or deceleration, and hence the drive control is performed with improved responsiveness to speed changes for acceleration and deceleration and improved travel stability during acceleration and deceleration. The ruling lines prescribe, on one hand, a high rotational speed for the smallest lateral deviation ("e") for acceleration and, on the other hand, a low rotational speed for the smallest lateral deviation ("e") for deceleration, and hence the drive control is performed with more improved responsiveness to speed changes for acceleration and deceleration and more improved travel stability during acceleration and deceleration.

Figure 11:
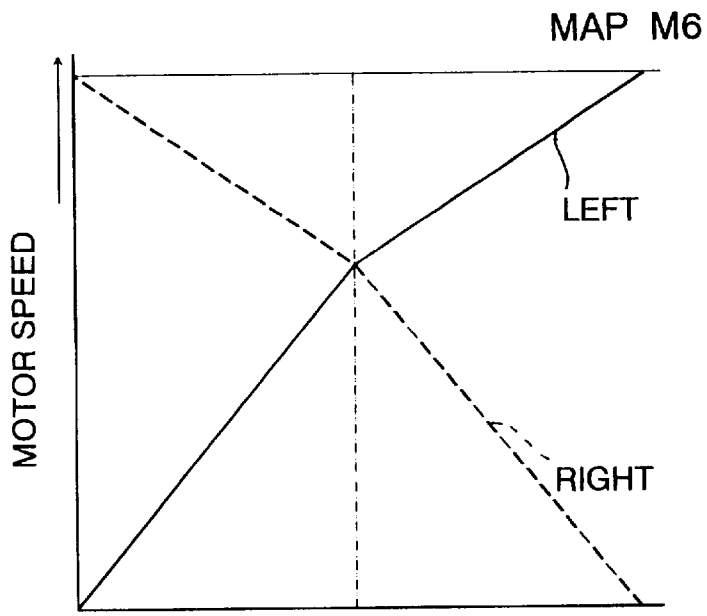
FIG. 11 is a drive ruling map for forward travel.
Figure 12:
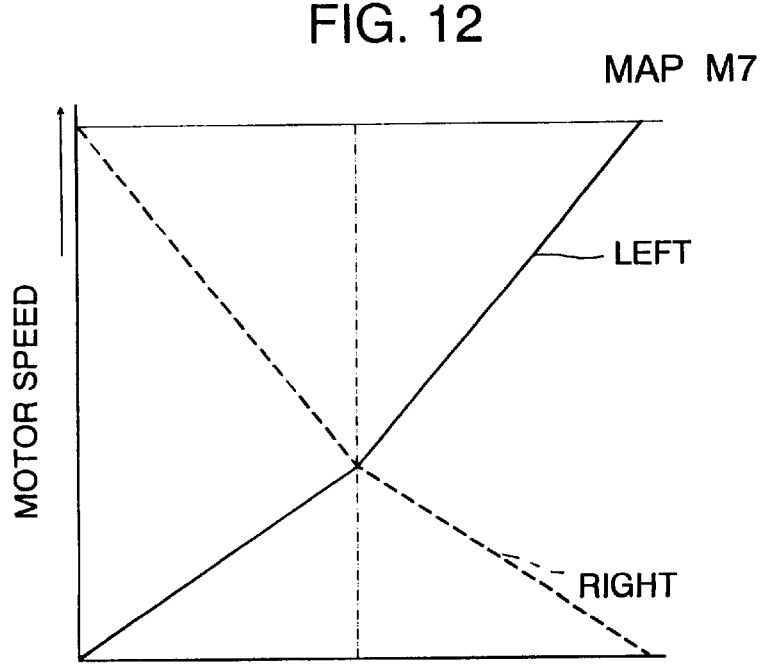
FIG. 12 is a drive ruling map for backward travel.

FIGS. 11 and 12 show forward and backward travel ruling maps M6 and M7 stored in RAM 17 and applied to the drive motor speed control. In these drive ruling maps M6 and M7 a chained line presents ruling lines for the right drive motor 11, and a solid line presents ruling lines for the left drive motor 12. The lateral deviations of the automatic guided vehicle 3 is detected by the rear path guide sensor 8R having the same physical and mechanical structure as the front path guide sensor 8F.

Figure 13:
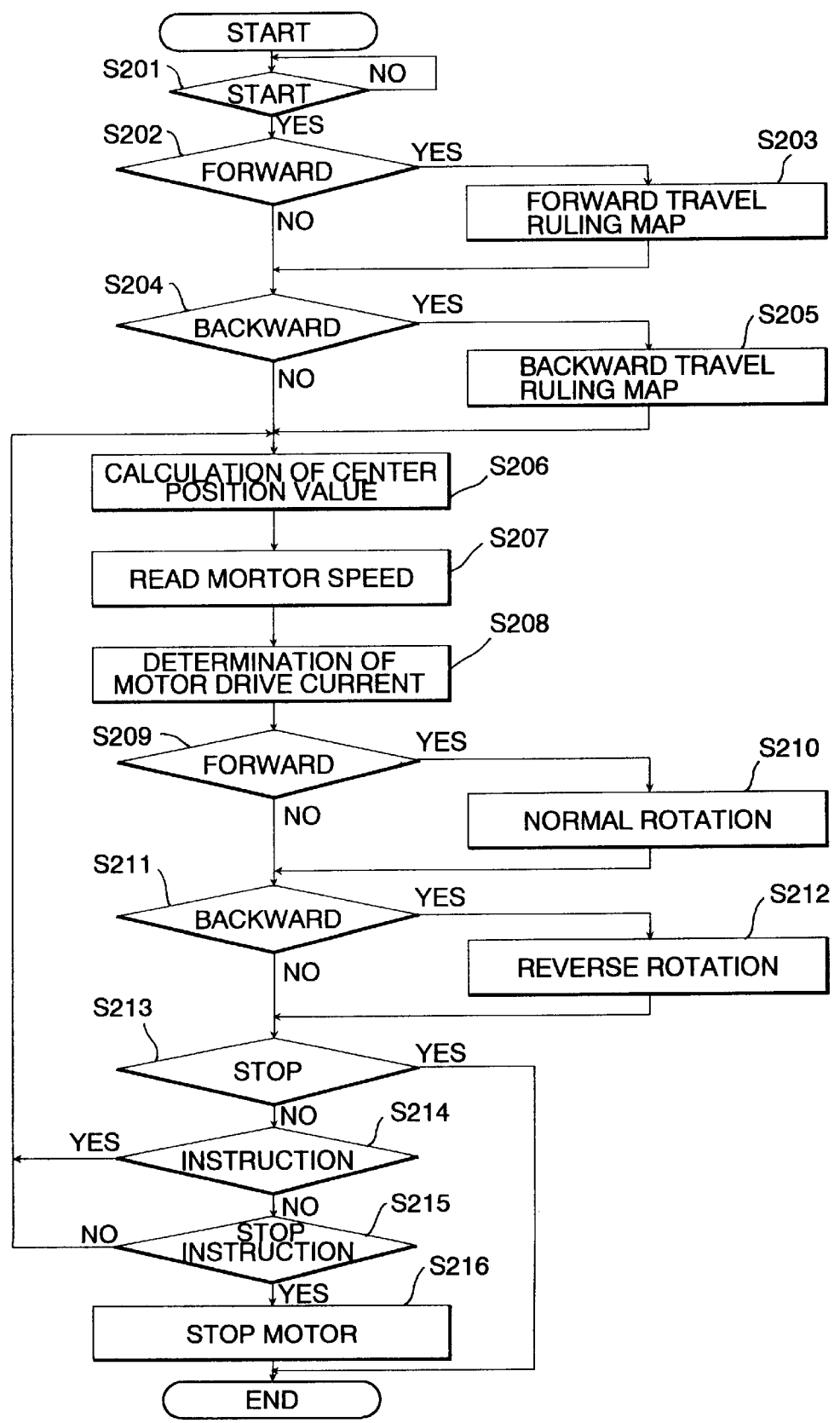
FIG. 13 is a flowchart illustrating the sequence routine of automatic guided vehicle forward and backward travel control.

FIG. 13 is a flowchart illustrating the automatic guided vehicle drive control sequence routine for forward and backward travel. When the flowchart logic commences and control directly passes to a decision at step S201 as to whether or not or not the automatic guided vehicle 3 is demanded to start. This decision is repeated until the automatic guided vehicle 3 starts. Subsequently, a determination is made at step S202 as to whether or not the automatic guided vehicle 3 travels forward or backward. In this instance, an instruction of backward travel is provided by a wireless station or a travel instruction tape 2B. Specific travel instruction tapes 2B have codes of a stop instruction and a resume instruction as well as speed instructions.

When it travels forward, the forward travel ruling maps M6 is retrieved at step S203. After the retrieval of the forward travel ruling maps M6, or when the automatic guided vehicle 3 is not determined to travel forward, then, another decision is subsequently made at step S204 as to whether or not the automatic guided vehicle 3 travels backward. When it travels backward, the backward travel ruling maps M7 is retrieved at step S205. After the retrieval of the backward travel ruling maps M7, or when the automatic guided vehicle 3 is not determined to travel backward, a relative position of the automatic guided vehicle 3 with respect to the path guide tape 2A is calculated based on output signals from the sensor elements P1–P16 of the rear path guide sensor 8R to find a lateral deviation of the automatic guided vehicle 3 from the prearranged travel path at step S206. Subsequently, rotational speeds for the right and left drive motors 11 and 12 are read from the drive ruling map M6 or M7 at step S207, and are fixed at step S208. Thereafter, a determination is made at step S209 as to whether or not the automatic guided vehicle 3 travels forward. When it travels forward, the right and left drive motors 11 and 12 are driven in the normal direction at the speeds read from the forward travel ruling map M6 at step S210. If the automatic guided vehicle 3 is somewhat out of the prearranged guide path, the right and left drive motors 11 and 12 are driven at different speed to shift the automatic guided vehicle 3 back to prearranged guide path. Thereafter, another decision is made at step S211 as to whether or not the automatic guided vehicle 3 travels backward. When it travels backward, the right and left drive motors 11 and 12 are driven in the reverse direction at the speeds read from the backward travel ruling map M7 at step S212. If the automatic guided vehicle 3 is somewhat out of the prearranged guide path, the right and left drive motors 11 and 12 are driven at different speed to shift the automatic guided vehicle 3 back to prearranged guide path. Thereafter, a determination is made at step S213 as to whether or not the automatic guided vehicle 3 is demanded to stop due to special demands provided other than travel instruction tapes when when the automatic guided vehicle 3 travels off the prearranged path, or when other sensors provide warnings. When it is demanded to stop, after stopping the right and left drive motors 11 and 12 at step S216, the drive control sequence routine is terminated. When the automatic guided vehicle 3 is not demanded to stop, determinations are subsequently made as to whether or not the travel instruction sensor 10 detects any one of the travel instruction tapes 2B at step S214 and as to whether or not the travel instruction tape 2B provides a stop instruction at step S215. When the stop instruction is detected at step S215, after stopping the right and left drive motors 11 and 12 at step S216, the backward travel control sequence routine is terminated. However, when no travel instruction tape 2B is detected at step S214, or when the travel instruction tape 2B provides no stop instruction at step S215, then, the drive control sequence routine returns to step S206 and repeated.

Because the forward and backward travel ruling maps M6 and M7 are prepared in RAM 17, the drive control is desirably performed regardless of the relative position between the drive wheels 4 and 5 and the guide path sensors 8F and 8R.

FIGS. 14 to 19 show a drive control system for a self-drive automatic guided vehicle provided with a single drive wheel and a steering means in accordance with another embodiment of the invention. A self-drive automatic guided vehicle 3 is equipped with a steering mechanism 26 comprising a steering disk 23 supported for rotation by the vehicle body a and a reversible type of steering motor 23a secured to the vehicle body a for rotating the steering disk 23. A driving torque transmission means, such as a gear train, a belt drive mechanism and the like, may be disposed between the steering disk 23 and steering motor 23a. A single front drive wheel 24 supported for rotation by the steering disk 23 is driven by a reversible type of drive motor 25 secured to the steering disk 23. The automatic guided vehicle 3 is provided with a pair of driven wheels, namely a rear right driven wheel 6 and a rear left driven wheel 7, supported by the vehicle body a. Each driven wheel 6, 7 may comprise a caster connected directly to the vehicle body a or a wheel connected by means of a swivel to the vehicle body a. The automatic guided vehicle 3 has a path guide sensor 8F and a travel instruction sensor 10 both of which are sensitive to the guide means 2. These sensors 8F and 10 may be magnetic sensors if a magnetic guide tape is employed as a guide means 2 which defines a prearranged travel path or may be an optical sensor if an optical guide tape is employed as the guide means 2.

Figure 15:
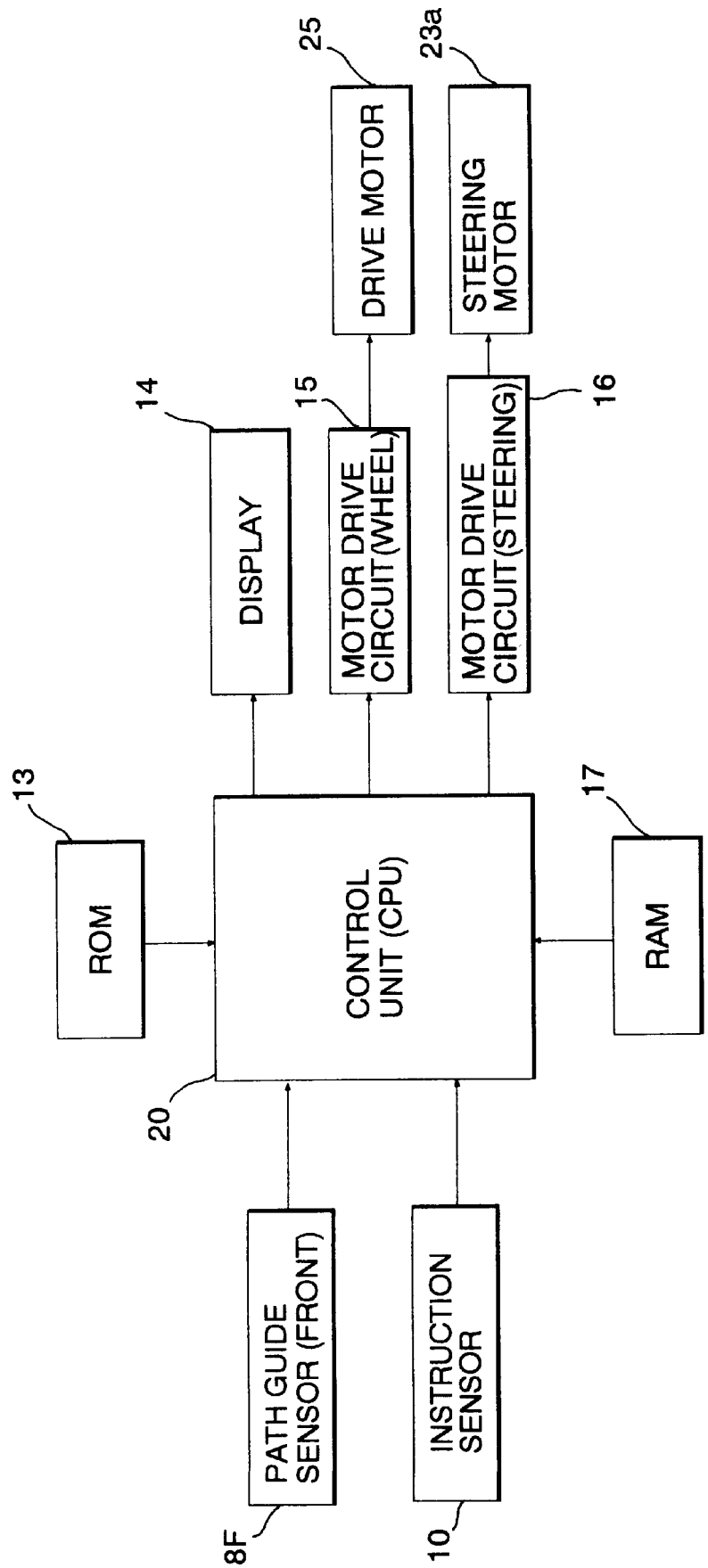
FIG. 15 is a block diagram of a control circuit of the automatic guided vehicle control system for controlling the automatic guided vehicle of FIG. 14.

FIG. 15 shows the automatic guided vehicle drive control system in block diagram. The drive control system includes a control unit 20, such as comprising a central processing unit (CPU), which receives signals from the path guide sensor 8F and the travel instruction sensor 10. Read only memory (ROM) 13 stores control programs which are read out to control operation display unit 14, and a motor drive control circuits 31 and 32 according to the signals. Random access memory (RAM) 17 stores various data of working area, control parameters, and steering ruling maps M8, M9 and M10 such as shown in FIG. 3. The display unit 14 displays various drive information that whether a start instruction or a stop instruction has been provided for the automatic guided vehicle 3. The motor drive control circuits 31 and 32 control operation of the wheel drive motor 23 and the steering motor 23a, respectively.

Figure 16:
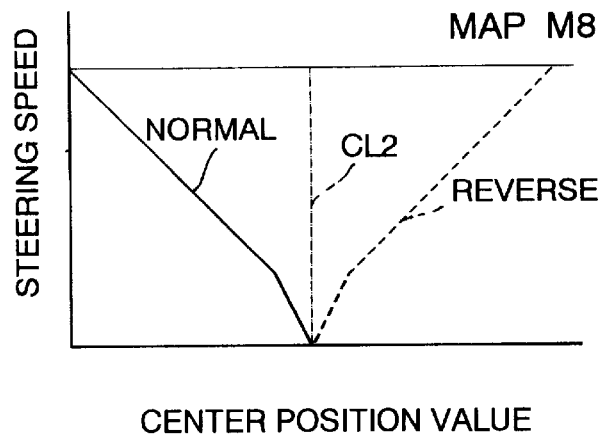
FIG. 16 is a drive ruling map for high speed travel used in the automatic guided vehicle control system shown in FIG. 15.
Figure 17:
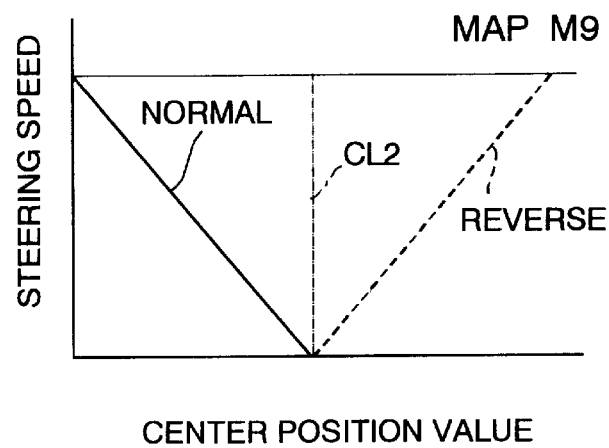
FIG. 17 is a drive ruling map for moderate speed travel used in the automatic guided vehicle control system shown in FIG. 15.
Figure 18:
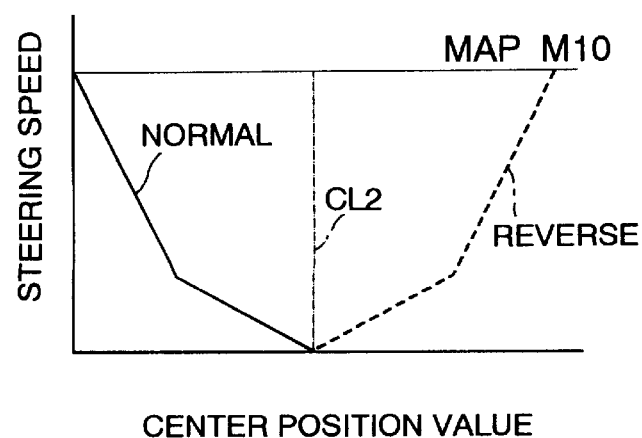
FIG. 18 is a drive ruling map for low speed travel used in the automatic guided vehicle control system shown in FIG. 15.

The steering ruling map M8 shown in FIG. 16 provides a prescribed relationship between rotational speeds of the steering motor 23a and lateral deviation as a control rule governing travel of the automatic guided vehicle 3. The steering ruling map M8 is stored in RAM 17 and is used when the automatic guided vehicle 3 travels at a high speed between 30 to 60 m/min. The steering ruling map M9 shown in FIG. 17 provides a prescribed relationship between rotational speeds of the steering motor 23a and lateral deviation as a control rule governing travel of the automatic guided vehicle 3. The steering ruling map M9 is stored in RAM 17 and is used when the automatic guided vehicle 3 travels at a moderate speed between 15 to 30 m/min. The steering ruling map M10 shown in FIG. 18 provides a prescribed relationship between rotational speeds of the steering motor 23a and lateral deviation as a control rule for governing travel of the automatic guided vehicle 3. The steering ruling map M10 is stored in RAM 17 and is used when the automatic guided vehicle 3 travels at a low speed between 5 to 15 m/min. In these steering ruling maps M8–M10, a solid line presents rotational speed ruling line for normal rotation of the steering motor 23a which causes right turns of the steering disk 23, and a chained line presents rotational speed ruling line for reverse rotation of the steering motor 23a which causes left turns of the steering disk 23. By selectively using these steering ruling maps M8–M10 according to travel speeds of the automatic guided vehicle 3, steering the automatic guided vehicle 3 is always performed at a suitable and safety speed.

Figure 19:
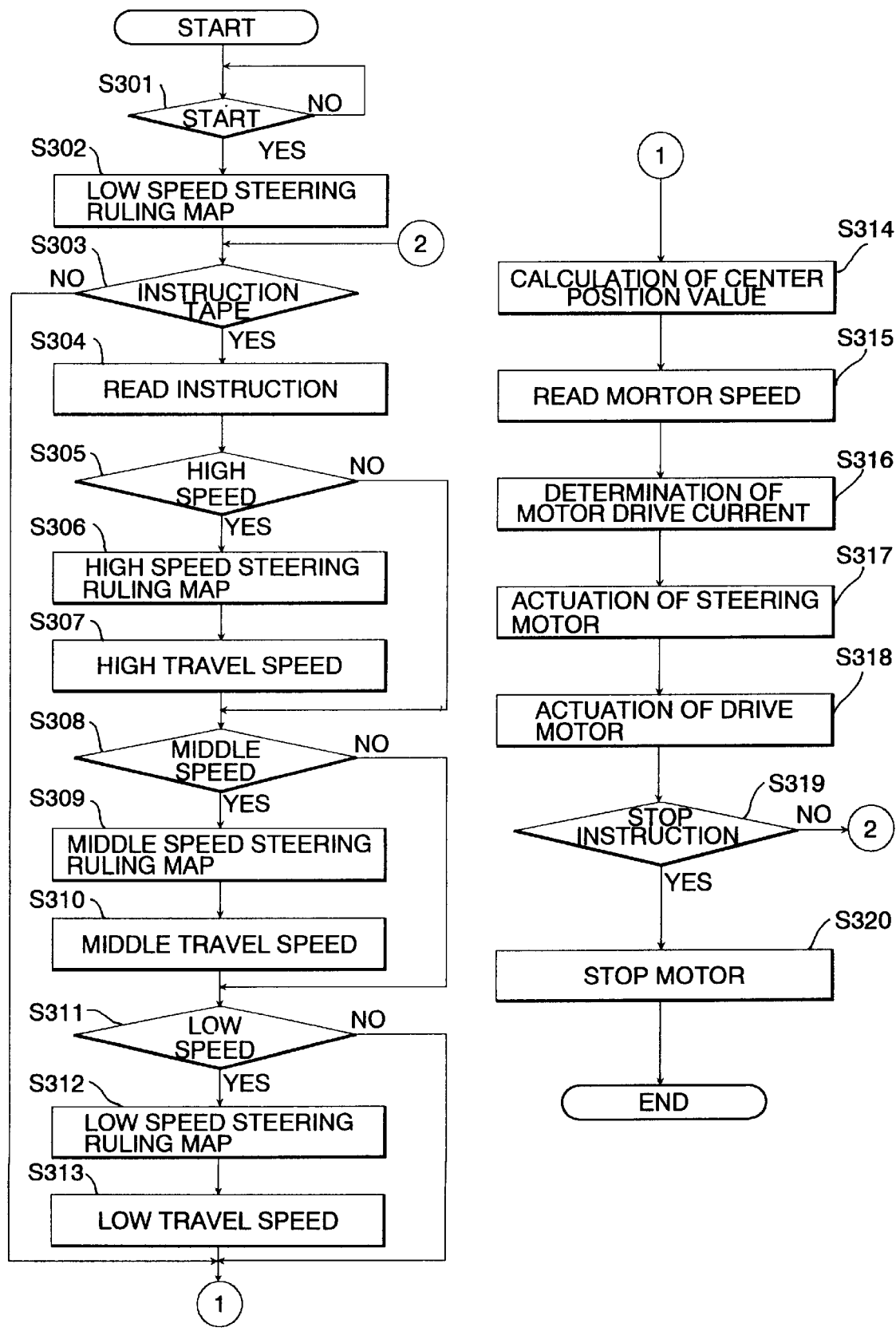
FIG. 19, comprising of FIGS. 19A and 19B, is a flowchart illustrating the sequence routine of automatic guided vehicle control applied to the single drive wheel automatic guided vehicle.

FIG. 19 is a flowchart illustrating the sequence routine of a drive control for the single wheel drive automatic guided vehicle. When the flowchart logic commences and control directly passes to a decision at step S301 as to whether or not the automatic guided vehicle 3 is demanded to start. When it is after starting, after retrieving the low speed steering ruling map M10 from RAM 17 and reading speeds on the steering ruling map M10 at step S302, a determination is subsequently made at step S303 as to whether or not a travel instruction tape 2B is detected by the travel instruction sensor 10. When the travel instruction sensor 10 detects a travel instruction tape 2B and provides an output signal of instruction code, after reading the travel instruction code at step S304, a determination is made based on the instruction code as to whether or not the automatic guided vehicle 3 is demanded to travel at a high speed at step S305. When the answer is affirmative, the high speed steering ruling map M8 is retrieved from RAM 17 at step S306 and, subsequently a high travel speed is set at step S307. Thereafter, or when the answer to the determination made at step S305 is negative, then, a determination is made based on the travel instruction code at step S308 as to whether or not the automatic guided vehicle 3 is demanded to travel at a moderate speed. When the answer is affirmative, the moderate speed steering ruling map M9 is retrieved from RAM 17 at step S309 and, subsequently a moderate travel speed is set at step S310. Thereafter, or when the answer to the determination made at step S308 is negative, then, a determination is made based on the travel instruction code at step S311 as to whether or not the automatic guided vehicle 3 is demanded to travel at a low speed. When the answer is affirmative, the low speed steering ruling map M8 is retrieved from RAM 17 at step S312 and, subsequently a low travel speed is set at step S313. Thereafter, or when the answer to the determination made at step S305 is negative, or no travel instruction tape 2B is detected, A calculation of a relative position of the automatic guided vehicle 3 with respect to the path guide tape 2A is made based on output signals from the sensor elements P1–P16 of the path guide sensor 8F to find a lateral deviation of the automatic guided vehicle 3 from the prearranged travel path at step S314. Further, based on the lateral deviation, a rotational speed for the steering motors 23a is read on the steering ruling map M8, M9 or M10 at step S315, and set at step S316. Subsequently, the steering motor 23a is actuated to rotate at the speed at step S317, and sequentially, the wheel drive motor 23 is actuated to rotate ar step S118. Thereafter, a determination is made at step S319 as to whether or not the travel instruction sensor 10 detects a travel instruction tape 2B indicating an halt instruction. Unless the halt instruction is detected, the drive control sequence routine is repeated from step S303. On the other hand, when the halt instruction is detected, after stopping the wheel drive motor 23 at step S320 the drive control sequence routine is terminated.

The drive control selectively uses the different steering ruling maps M8, M9 and M10 in compliance with vehicle travel speeds and lateral deviations. The drive control for the single wheel drive automatic guided vehicle in which the travel control and the steering control are performed independently provides the ability to follow the prearranged travel path more improved as compared with the drive control for the two wheel drive automatic guided vehicle.

In the drive control system in which prescribed relationships of control or control rules are stored as drive ruling maps in RAM 17, it is easy to replace, change and/or modify these control rules. Control rules may be prescribed for a number of ranges of vehicle travel speeds more than three.

In particular, in the case of a single drive wheel automatic guided vehicle, dividing vehicle travel speeds into a number of ranges produces a good effect on automatic guided vehicles having a number of driven wheels.

Figure 20:
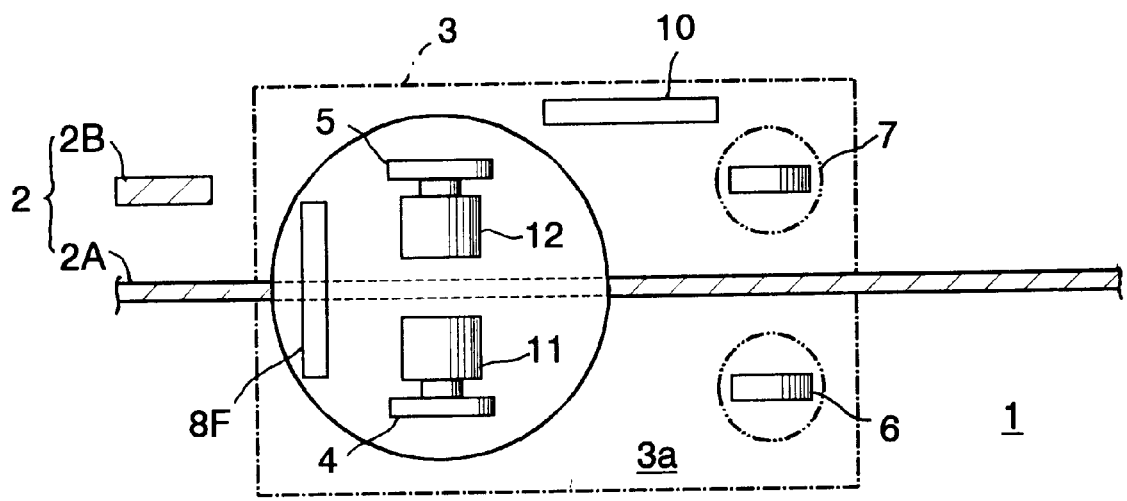
FIG. 20 is a bottom view of another type of automatic guided vehicle equipped with a drive control system in accordance with an embodiment of the invention.

FIG. 20 shows an variation of the automatic guided vehicle 3 controlled by the drive control system of the invention, the automatic guided vehicle 3 travels on a floor 1 along a prearranged travel path which is established by a guide means 2 laid on or secured to the floor 1. The automatic guided vehicle 3 is equipped with a steering mechanism 26 comprising a steering disk 22 pivoted for rotation on a pivot shaft 21 secured to the under side of the vehicle body a and a reversible type of right and left electric drive motors 11 and 12 secured to the steering disk 22 at diametrically opposite positions with respect to the pivot shaft 21. The right drive motor 11 is directly connected to a front right drive wheel 4, and the left drive motor 12 is directly connected to a front left drive wheel 5. The automatic guided vehicle 3 has a pair of driven wheels, namely a rear right driven wheel 6 and a rear left driven wheel 7, supported by the vehicle body a. Each driven wheel 6, 7 may comprise a caster connected directly to the vehicle body a or a wheel connected by means of a swivel to the vehicle body a. The automatic guided vehicle 3 has a path guide sensor 8F and a travel instruction sensor 10 both of which are sensitive to the guide means 2. These sensors 8F and 10 may be magnetic sensors if a magnetic guide tape is employed as the guide means 2 or may be an optical sensor if an optical guide tape is employed as the guide means 2. The steering disk 22 turns when the right and left drive motors 11 and 12, and hence the right and left drive wheels 4 and 5, rotate differentially, so as to steer the automatic guided vehicle 3. The angle of turn of the steering disk 22 depends upon the speed difference between the right and left drive wheels 4 and 5.

Figure 21:
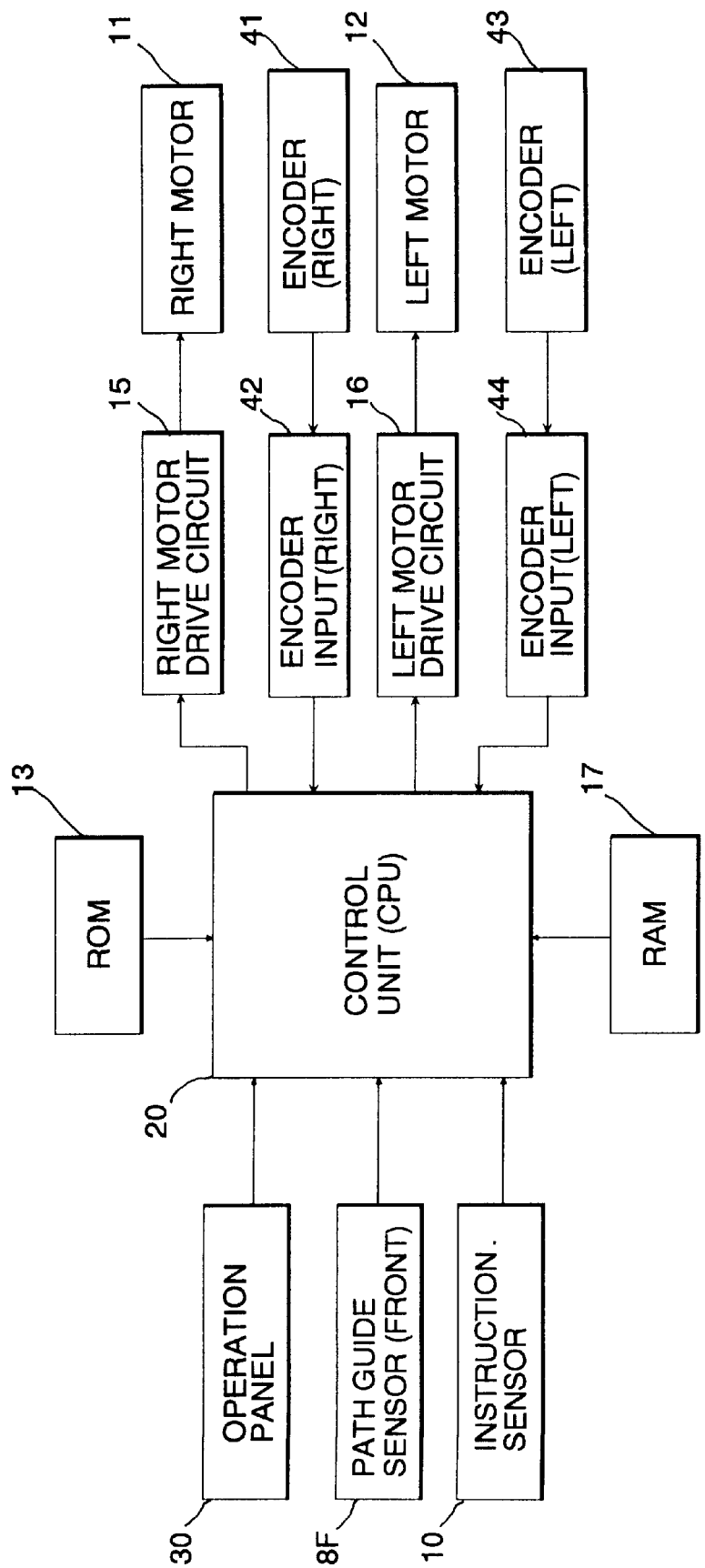
FIG. 21 is a functional block diagram of a control circuit of the automatic guided vehicle control system for controlling the automatic guided vehicle of FIG. 20.
Figure 23:
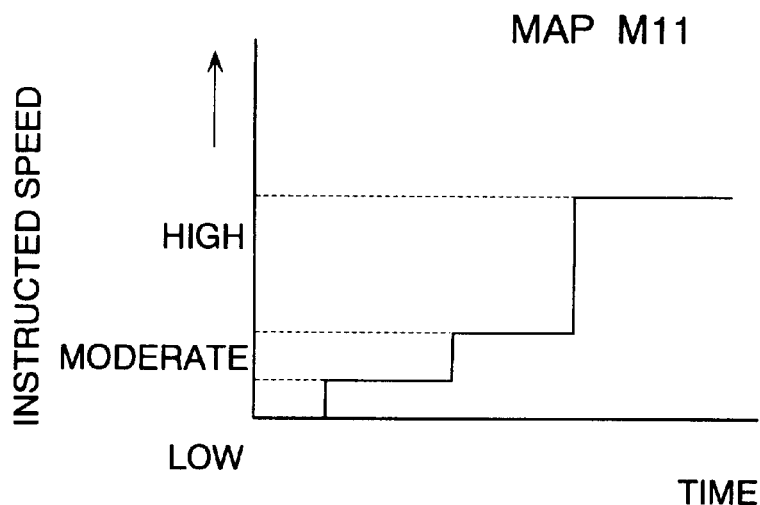
FIG. 23 is a drive ruling map for controlling travel speed of the automatic guided vehicle.
Figure 24:
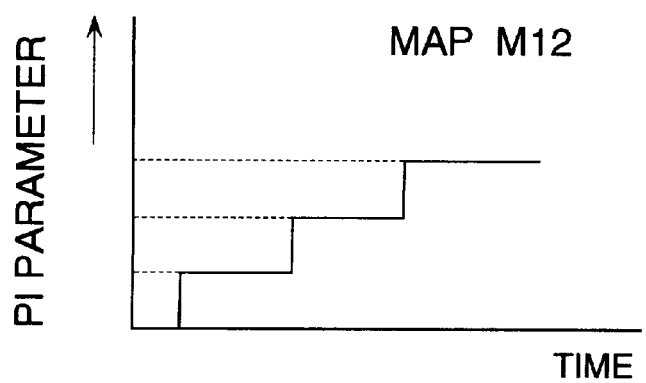
FIG. 24 is a ruling map for PI control parameter.
Figure 26:
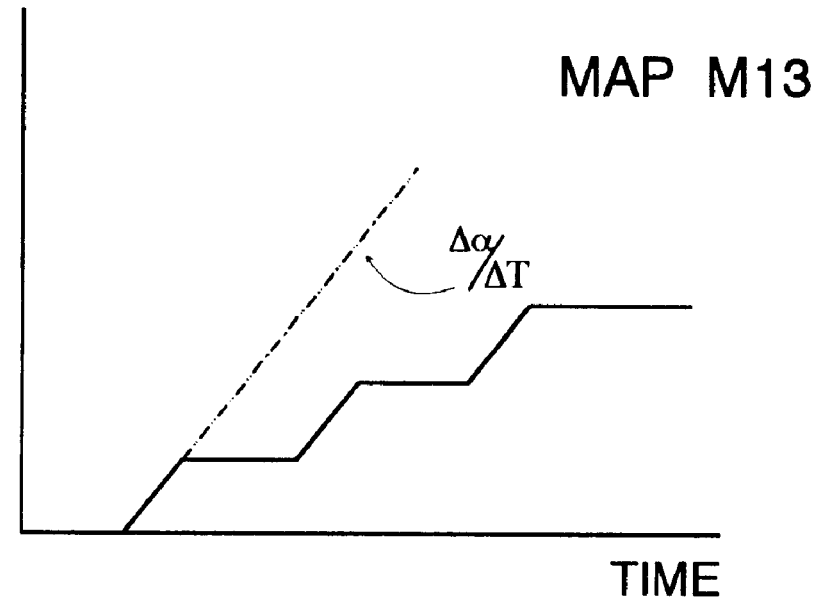
FIG. 26 is a ruling map for a change rate of PI control parameter.
Figure 27:
FIG. 27 is an explanatory illustration of center position value when the variable parameter control is performed.

FIG. 21 shows an automatic guided vehicle drive control system in accordance with another embodiment of the invention which is applied to the two wheel drive automatic guided vehicle 3 shown in FIG. 20. The drive control system includes a control unit 20, such as comprising a central processing unit (CPU), which receives signals from start/stop switch of a control panel 30, the path guide sensor 8F and the travel instruction sensor 10. Read only memory (ROM) 13 stores control programs which are read out to control motor drive circuits 15 and 16 according to the signals. Random access memory (RAM) 17 stores various drive ruling maps M11, M12 and M13 such as shown in FIGS. 23, 24 and 26, various data of working area, control parameters, and other necessary data. The motor drive circuits 15 and 16 control operation of the right and left drive motors 11 and 12, respectively. Relating to the right drive motor 11, the control system includes an encoder 41 to detect the rotational speed of the right drive motor 11 and a feedback circuit 42 to feedback the rotational speed to the control unit 20. Similarly, relating to the left drive motor 12, the control system includes an encoder 43 to detect the rotational speed of the left drive motor 11 and a feedback circuit 44 to feedback the rotational speed to the control unit 20.

Drive ruling map M11 shown in FIG. 23 prescribes travel speeds of the automatic guided vehicle 3 for divided into three steps, namely a low travel speed, a moderate travel speed and a high travel speed. Proportional-integral control parameter ruling map M12 shown in FIG. 24 prescribes proportional-integral control parameters (which are hereafter referred to as PI control parameters for simplicity) for the three steps of vehicle travel speeds. Controlled variable ruling map M13 shown in FIG. 26 prescribes changing rates or inclines ($\Delta\alpha/\Delta T$) in controlled variable of the PI control parameter which are made to adapt to a lag system in the control system.

Figure 22:
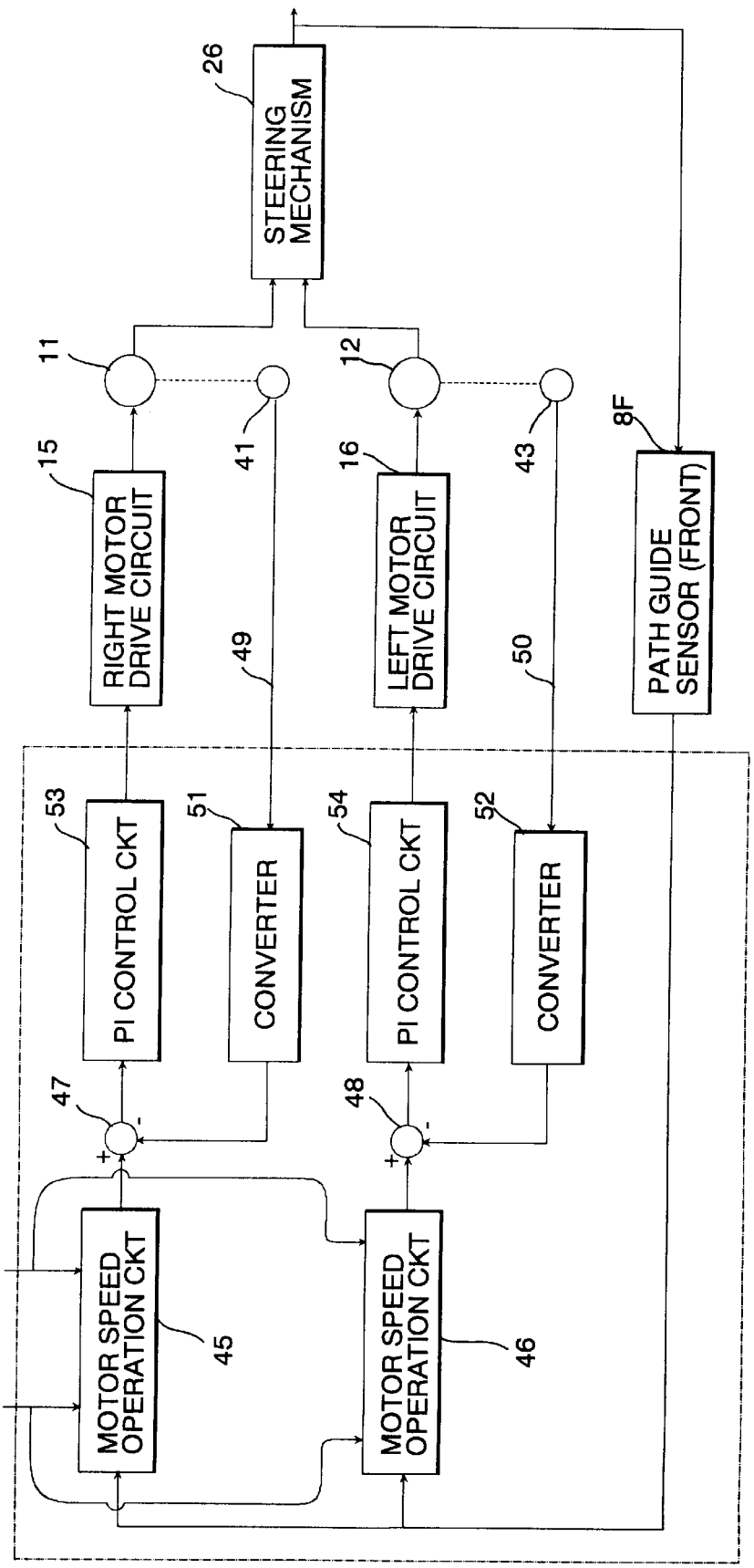
FIG. 22 is a block diagram of a control circuit of the automatic guided vehicle control system equivalent to the functional block diagram of FIG. 21.

FIG. 22 shows a control block diagram equivalent to the functional block diagram shown in FIG. 21. Signals of a lateral deviation of the automatic guided vehicle 3 from the path guide tape 2A and a travel instruction read from a travel instruction tape 2B are sent to both speed operation circuits 45 and 46 to calculate rotational speeds for the right and left drive motors 11 and 12, respectively. These rotational speeds are compared to rotational speeds sent from the encoders 41 and 43 through converters 51 and 52 to calculate deviations in rotational speed as controlled variables at comparators 47 and 48, respectively. Each converter 51, 52 calculates a rotational speed per unit time of the drive motor by dividing the number of pulses per unit time provided by the encoder 41, 43 by the number of pulses per a revolution of the drive motor 11, 12.

The controlled speed deviations are transmitted to PI control circuits 53 and 54, respectively, for a proportional integral operation. The encoders 41 and 43 are connected to the convertor circuits 51 and 52 through feedback lines 49 and 50, respectively. A signal of lateral deviation of the automatic guided vehicle 3 is sent to each of the speed operation circuits 45 and 46 through a line 56. The operated controlled speed deviations are transmitted to the motor drive circuits 15 and 16 to drive the right and left drive motors 11 and 12 independently.

Figure 14:
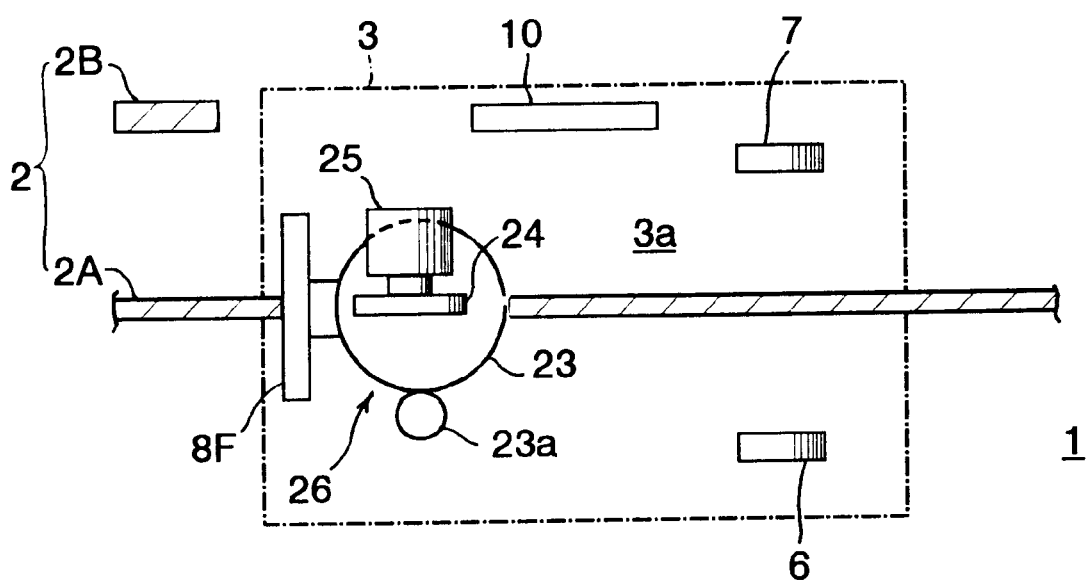
FIG. 14 is a bottom view of another type of automatic guided vehicle equipped with a drive control system in accordance with an embodiment of the invention.
Figure 28:
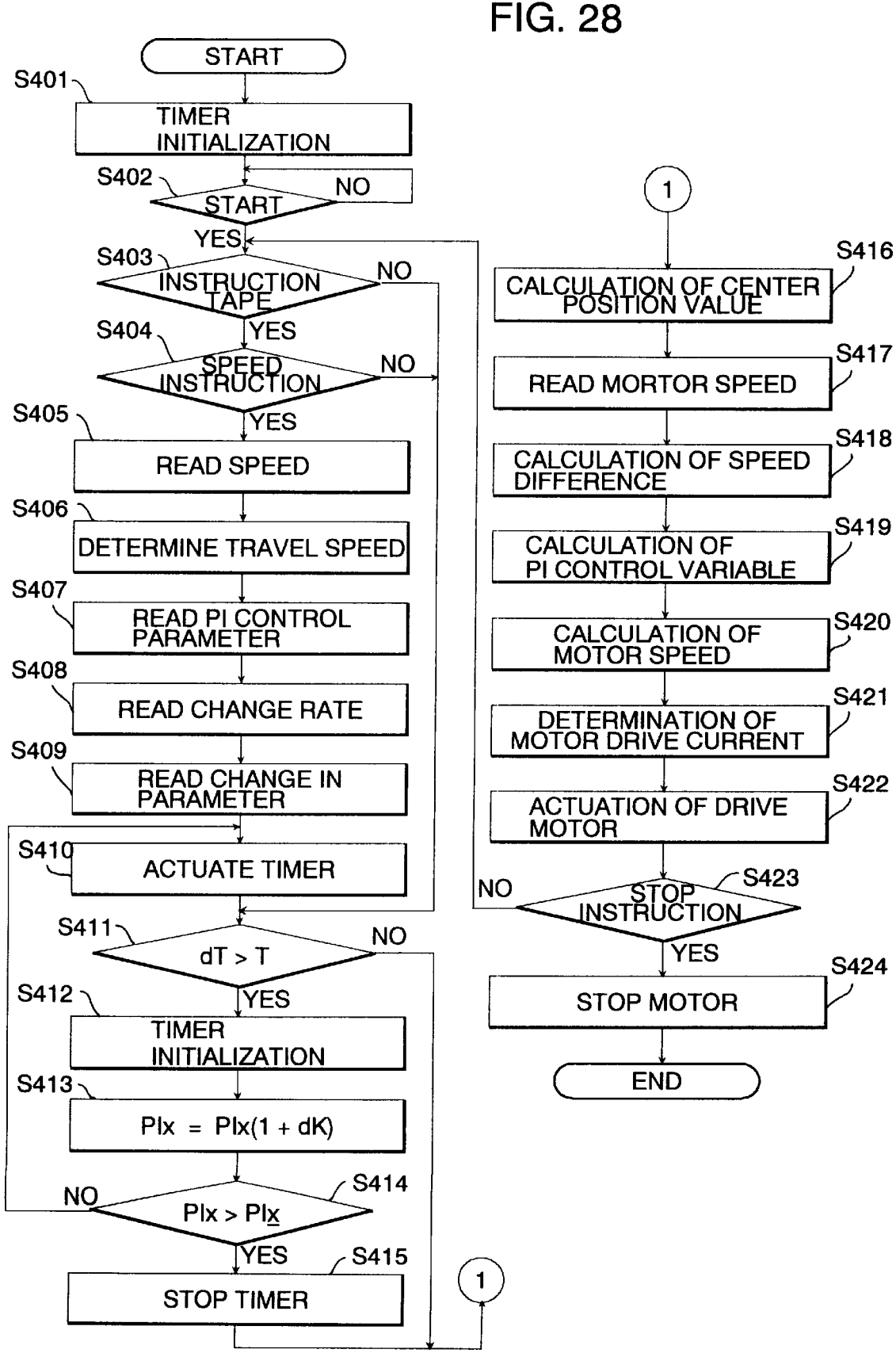
FIG. 28 is a flowchart illustrating the sequence routine of variable parameter control.

FIG. 28 is a flowchart illustrating the drive control sequence routine for the automatic guided vehicle 3 shown in FIG. 14. When the flowchart logic commences and control directly passes to a function block at step S401 where a CPU built-in time counter, such as an elapsed time integrator, is initialized or reset to zero. Subsequently, at step S402, a decision is made as to whether or not the automatic guided vehicle 3 is demanded to start. This decision is repeated until the automatic guided vehicle 3 starts. When it is immediately after starting, decisions are subsequently made at steps S403 and 404 as to whether or not the travel instruction sensor 10 detects any one of the travel instruction tapes 2B and provides an output signal, and whether or not, when the travel instruction sensor 10 provides an output signal, a speed instruction of the travel instruction tape 2B is read, respectively. If the answers are affirmative at both steps S403 and S404, the drive ruling map M11 (FIG. 23) is retrieved from RAM 17 at step S405, and a travel speed is read as a target speed from the ruling map M11 (FIG. 23) at step S406. Subsequently, a PI control parameter is read as a target parameter from the PI control parameter ruling map M12 (FIG. 24) at step S407, and a PI control parameter changing rate ($\Delta\alpha/\Delta T$) is read from the PI control parameter changing rate ruling map M13 (FIG. 26) at step S408. A calculation is made at step S409 to find a change $\Delta\beta$ in PI control parameter by subtracting the latest PI control parameter from the PI control parameter read at step S407.

After actuating the time counter at step S410, a determination is made at step S411 as to whether or not a the time counter has integrally counted an elapsed time T greater than the time $\Delta T$, which is fixed to, for example, approximately 100 msec. necessary to cause an increment in control parameter of $\Delta\alpha$, at step S411. When the elapsed time counter counts over the fixed time $\Delta T$, after resetting the timer counter to zero at step S412, the latest PI control parameter is updated by an increment of the control parameter change $\Delta\alpha$ and memorized at step S413. Subsequently, at step S414, a determination is made at step S414 as to whether or not the up-dated PI control parameter has become equal to or greater than the target PI control parameter.

When the answer is affirmative, the time counter is stopped at step S415. However, the answer to the decision is negative, the change in PI control parameter is repeatedly increased by the increment Δα through steps S408 to S414 until the up-dated PI control parameter reaches the target PI control parameter. In this manner, the stepwise PI control parameter shown in FIG. 24 gradually changes at an inclination as shown in FIG. 26 so as to adapt the control system.

After stopping the timer counter at step S415 or when the answer to the determination made at step S401, S402 or S411 is negative, a center position value of the automatic guided vehicle 3 is calculated based on output signals from outputting sensor elements of the path guide sensor 8F to find a lateral deviation of the automatic guided vehicle 3 from the prearranged travel path at step S416. Subsequently, rotational speeds for the right and left drive motors 11 and 12 are read as target speeds from a drive ruling map. The target rotational speeds are compared with actual rotational speeds of the right and left drive motors 11 and 12 detected by the encoders 41 and 43 respectively to find speed deviations at step S418. Subsequently, after calculating PI controlled variables at step S419, eventual rotational speeds for the right and left drive motors 11 and 12 in consideration with the PI control factors necessary to cancel the speed deviations are calculated at step S420, and current values for the drive motors 11 and 12 to rotate at the calculated rotational speeds at step S421. At step S422, the right and left drive motors 11 and 12 are actuated and rotated with the current values at the calculated rotational speeds, respectively. Thereafter, a determination is made at step S423 as to whether or not the travel instruction sensor 10 detects a travel instruction tape 2B instructing a halt. Unless a halt instruction is detected, the drive control sequence routine is repeated from step S403. On the other hand, when a halt instruction is detected, the right and left drive motors 11 and 12 are stopped and the drive control sequence routine is terminated.

Figure 25:
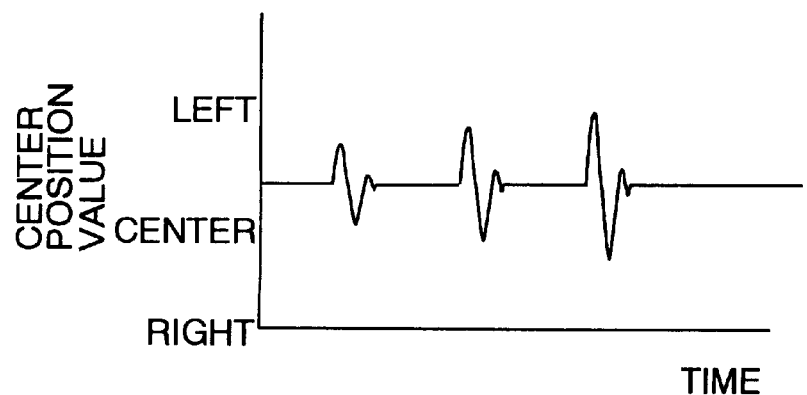
FIG. 25 is an explanatory illustration of center position value when the variable parameter control is not performed.

The travel speeds read from the drive ruling map M11 at step S406 is attained by control with a gradual variation of PI control parameter through steps S408 to S414, which prevents or significantly reduces lateral sway motion of the automatic guided vehicle 3. Specifically, in general, the controlled variable for varying travel speeds read on the ruling map M11 varies causing repetitive overshoot and undershoot as shown in FIG. 25 due to the fact that changing a proportional gain and an integral time constant stepwise as shown in FIG. 24 makes the control system to take a time before becoming stable. However, with the control system of the invention, the PI control parameter is varied with an incline with slight fluctuations only, preventing the automatic guided vehicle 3 from encountering lateral sway motion. The change in the control parameter is calculated by use of a PI control parameter changing rate ($\Delta\alpha/\Delta T$), the utilization is made of a single control logic for different ranges of vehicle travel speeds, for instance a high speed range, a moderate speed range and a low speed range. The right and left drive motors 11 and 12 are independently controlled to produce a speed difference between the right and left drive wheels based on which the automatic guided vehicle 3 is steered to remove a lateral deviation, the steering mechanism is more simple for the two drive wheel type of automatic guided vehicle as compared with the single drive wheel type of automatic guided vehicle.

In the drive control system of this embodiment the drive ruling maps M2, M3 and M4 shown in FIGS. 5 to 7 may be used in place of the drive ruling map M11 shown in FIG. 23. In this case, the control parameter for the right and left drive motors 11 and 12 may be varied to gradually change the travel speed of vehicle to the instructed speed.

Figure 29A:
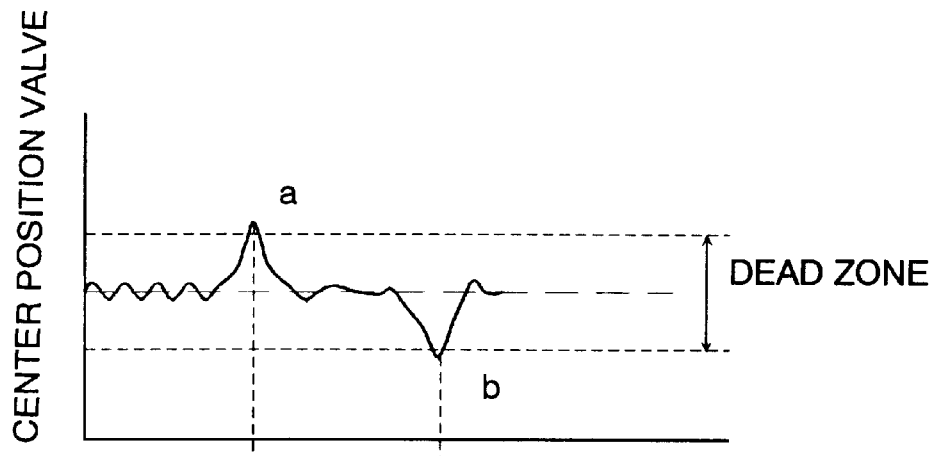
FIGS. 29A, 29B, and 29C are explanatory illustrations of the relationship between center position value and motor speed when a dead zone is provided.
Figure 29B:
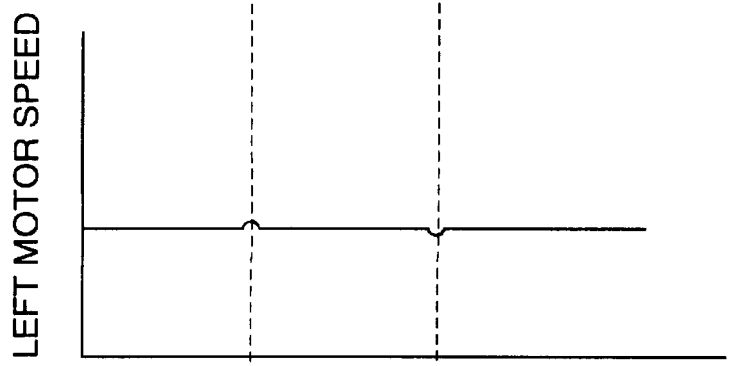
Figure 29C:
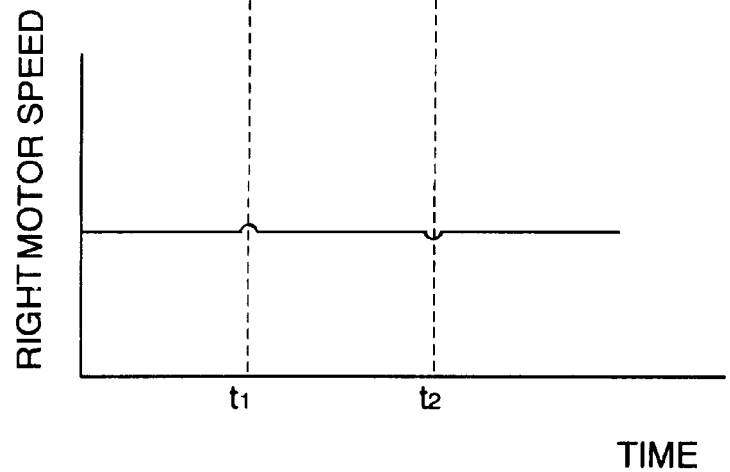

FIGS. 29(A) to 29(C) and 30 show an automatic guided vehicle drive control system in accordance with another embodiment of the invention. The drive control system incorporates the control circuit shown in FIG. 21. Each of the speed operation circuits 45 and 46 is modified to have a dead zone D to a specified range of lateral deviation of the automatic guided vehicle as shown in FIG. 29(A).

Figure 30:
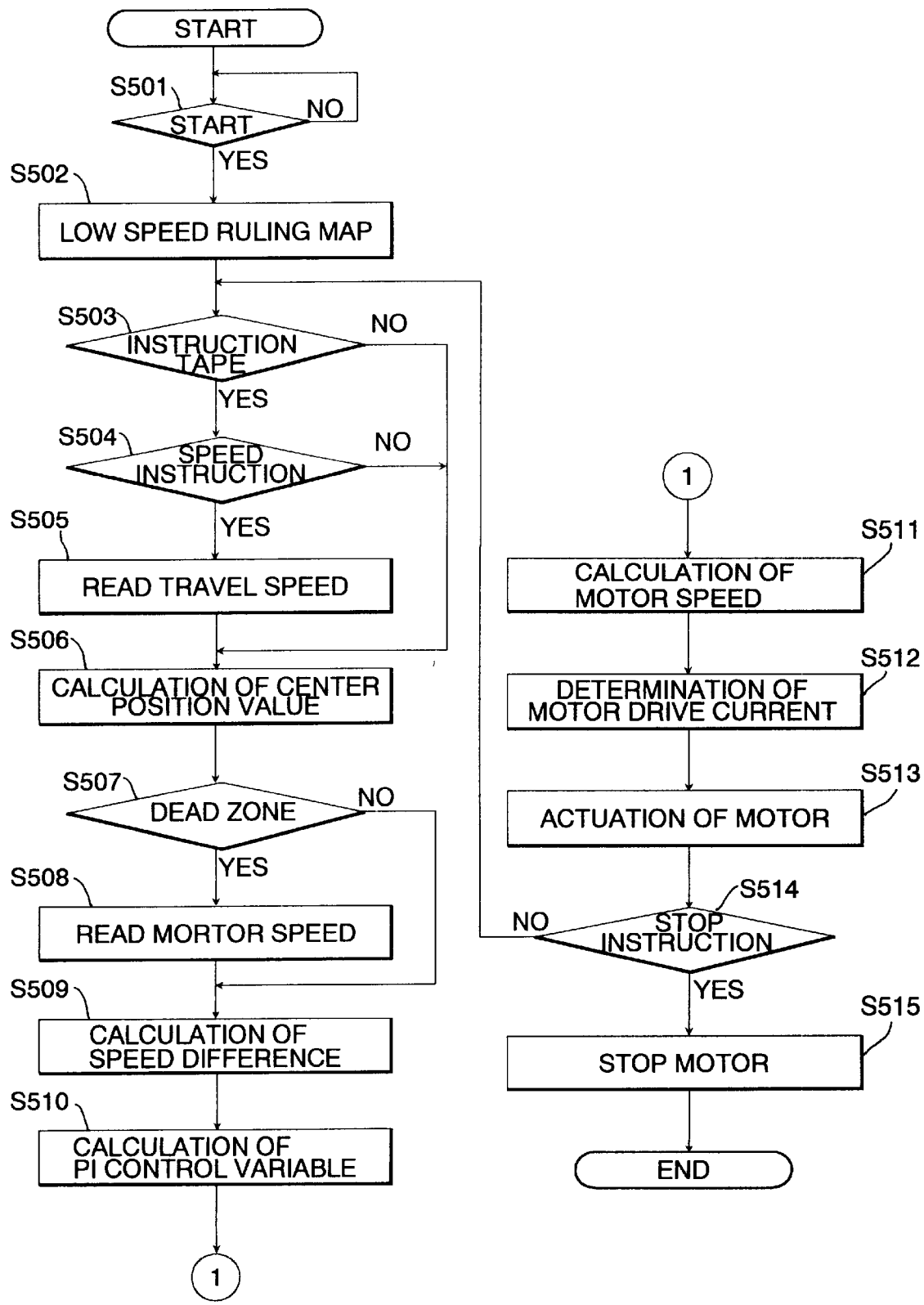
FIG. 30 is a flow chart illustrating the sequence routine of dead zone control.

FIG. 30 is a flowchart illustrating the drive control sequence routine for the automatic guided vehicle 3. When the flowchart logic commences and control directly passes to a function block at step S501 where a decision is made as to whether or not the automatic guided vehicle 3 is demanded to start. This decision is repeated until the automatic guided vehicle 3 starts. When it is immediately after starting, a specified rotational speed for each drive motor 11, 12 is initially set to, for example, a low rotational speed at step S502. Decisions are subsequently made at steps S503 and S504 as to whether or not the travel instruction sensor 10 detects any one of the travel instruction tapes 2B and provides an output signal at step S503, and whether or not, when the travel instruction sensor 10 provides an output signal, a travel speed instruction of the travel instruction tape 2B is read at step, respectively. If both of the answers are affirmative at both steps S403 and S404, the, rotational speeds are set according to the travel speed instruction at step S505. Subsequently, a relative position of the automatic guided vehicle 3 with respect to the path guide tape 2A is calculated based on output signals from the sensor elements P1–P16 of the path guide sensor 8F to find a lateral deviation of the automatic guided vehicle 3 from the prearranged travel path at step S506. At step S507, a decision is made as to whether the lateral deviation is within the dead zone D. After calculating rotational speeds for the right and left drive motors 11 and 12 at step S508 when the lateral deviation is out of the dead zone D, or without calculating rotational speeds for the right and left drive motors 11 and 12 when the lateral deviation is within the dead zone D, the rotational speeds are compared with actual rotational speeds of the right and left drive motors 11 and 12 respectively to find controlled speed deviations at step S509. Subsequently, after calculating PI controlled variables at step S510, rotational speeds for the right and left drive motors 11 and 12 are calculated at step S511 and set at step S512. At step S513, the right and left drive motors 11 and 12 are actuated to rotate at the calculated rotational speeds, respectively. Thereafter, a determination is made at step S514 as to whether or not the travel instruction sensor 10 detects a travel instruction tape 2B instructing a halt. Unless a halt instruction is detected, the drive control sequence routine is repeated from step S503. On the other hand, when a halt instruction is detected, the right and left drive motors 11 and 12 are stopped, and the drive control sequence routine is terminated.

While lateral deviations out of the dead zone D as labeled "a" and "b" in FIG. 29(A) occur when the automatic guided vehicle 3 travels on a bumpy floor and/or slips on a floor, the right and left drive motors 11 and 12 operate differentially to correct the traveling course of the automatic guided vehicle 3 when such lateral deviation occurs.

As apparent, when the lateral deviation is within the dead zone D, changing the rotational speeds for the drive motors 11 and 12 is interrupted at the speed operation circuits 45 and 46, so as to prevent the steering mechanism 26 from being exposed to constant overcontrol which causes a decrease in durability and life of the steering mechanism 26.

Figure 31:
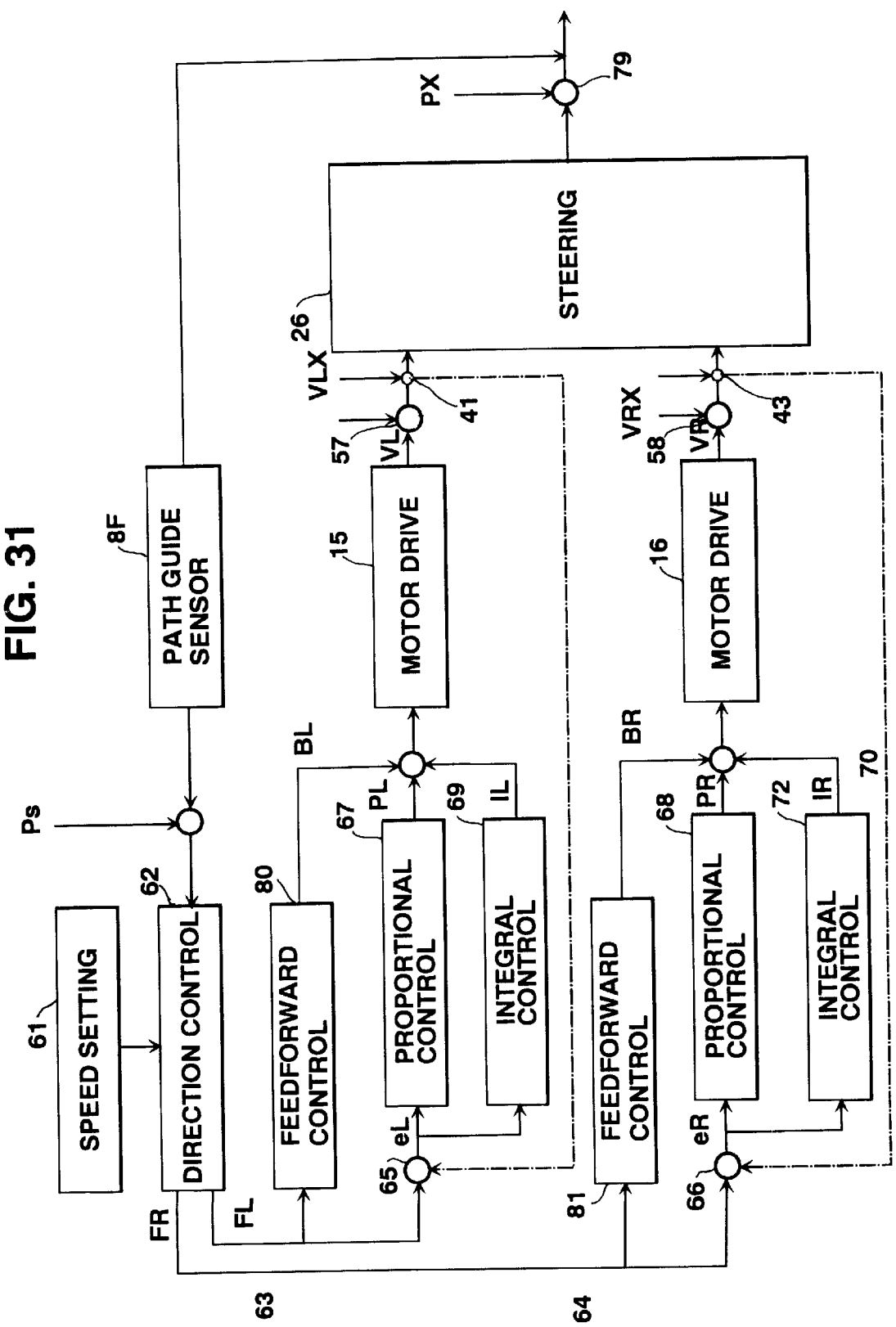
FIG. 31 is a block diagram of a control circuit of a drive control system in accordance with another embodiment of the invention.

FIG. 31 shows a drive control system according to another embodiment of the invention. The drive control system comprises a travel speed control section 61 and a path control section 62 which is connected at its input end to the travel speed control section 61 and at its output ends to comparators 65 and 66 for the right and left drive motors 11 and 12 through lines 63 and 64, respectively. The comparator 65 at its deviation output end is connected to a proportional control section 67 and an integral control section 69. These proportional and integral control sections 67 and 69 at their output ends are connected to a comparator 71 to which the right drive motor 11 (which is omitted in FIG. 31) is connected through a motor drive circuit 15. An encoder 41 at its output end is connected to the comparator 65 through a feedback line 73 provided with the converter 51 (see FIG. 22). Similarly, the comparator 66 at its deviation output end is connected to a proportional control section 68 and an integral control section 70. These proportional and integral control sections 68 and 70 at their output ends are connected to a comparator 72 to which the left drive motor 12 (which is omitted in FIG. 31) is connected through a motor drive circuit 16. An encoder 43 at its output end is connected to the comparator 66 through a feedback line 74 provided with the converter 52 (see FIG. 22). The reason for the necessity of integral control sections 69 and 70 is to adapt to constant occurrence of deviation during traveling on a slop. Each motor 11, 12 is controlled by the pulse width modulation method through the motor drive circuit 15, 16.

A steering mechanism 26 supports the right and left drive motors 11 and 12 to which right and left drive wheels (not shown) are directly connected respectively. These drive motors 11 and 12 are differentially driven according to lateral deviations of the automatic guided vehicle 3 from the prearranged travel path, which is detected by a path guide sensor 8F to correct the traveling course. A comparator 76, disposed between the path guide sensor 8F and the path control section 62, compares a target value of lateral deviation and an output value of lateral deviation from the path guide sensor 8F and provides a deviation output for the path control section 62. A comparator 77, disposed between the motor drive circuit 15 and the encoder 41, compares the rotational speed of motor $V_L$ with disturbance $V_{LX}$ and sends its to the encoder 41. Similarly, a comparator 78, disposed between the motor drive circuit 16 and the encoder 43, compares the rotational speed of motor $V_R$ with disturbance $V_{RX}$ and sends its to the encoder 43. A comparator 79, disposed between the steering mechanism 26 and the path guide sensor 8F, compares an amount of steering P with disturbance $P_X$ and sends its output to the path guide sensor 8F.

The encoder 41 and comparator 65 connected through the line 73 form parts of a feedback circuit for providing a feedback signal relating to a rotating condition of the right drive motor 11 to the proportional control section 67. Similarly, the encoder 43 and comparator 66 connected through the line 74 form parts of a feedback circuit for providing a feedback signal relating to a rotating condition of the left drive motor 12 to the proportional control section 68. A feedforward section 80 is disposed between the comparator 71 and the output end of the path control section 62 at which control sections 67 and 69 for the right drive motor 11 are connected to the path control section 62. Similarly, a feedforward section 81 is disposed between the comparator 72 and the output end of the path control section 62 at which control sections 68 and 70 for the left drive motor 12 are connected to the path control section 62. In other words, each feedforward section 80, 81 is disposed in parallel to both proportional control section 67, 68 and integral control section 69, 70. These feedforward sections 80 and 81 compensate disturbance.

Letting $F_R$, $F_L$, $P_S$ and P be rotational speeds of the right and left drive motors 11 and 12 necessary to correct a lateral deviation of the automatic guided vehicle 3 from the prearranged travel path caused due, for instance, to changes in floor surface conditions and/or changes in location of the path guide tape 2A along right and left curves of the prearranged travel path, a target center position value for travel path control, and a steering variable of the steering mechanism 26, the following functional relationship is given among these factors:

$$F_R=f(P_S-P\pm P_X)$$

$$F_L=f(P_S-P\pm P_X)$$

where $P_X$ is disturbance against the steering mechanism 26. Feedforward control variables $B_R$ and $B_L$ for the right and left drive motors 11 and 12 are given by the following functions:

$$B_R=f(F_R)$$

$$B_L=f(F_L)$$

Proportional control variables $P_R$ and $P_L$ for the right and left drive motors 11 and 12 are given by the following equations:

$$P_R=K_p\cdot(F_R-V_R\pm V_{RX})=K_p\cdot e_R$$

$$P_L=K_p\cdot(F_L-V_L\pm V_{LX})=K_p\cdot e_L$$

where $K_p$ is the proportional gain;

$V_R$ is the rotational speed of the right drive motor;

$V_{RX}$ is the disturbance relating to the right drive motor;

$e_R$ is the rotational speed deviation for the right drive motor;

$V_R$ is the rotational speed of the left drive motor;

$V_{LX}$ is the disturbance relating to the left drive motor; and $e_R$ is the rotational speed deviation for the left drive motor.

Integral control variables $I_R$ and $I_L$ for the right and left drive motors 11 and 12 are given by the following equations:

$$I_R=K_i\cdot\int e_R\cdot dt+C_R(0)$$

$$I_L=K_i\cdot\int e_L\cdot dt+C_L(0)$$

where $K_i$ is the integral gain which is expressed by the reciprocal of the integral time constant TI;

$C_R(0)$ is the offset value for the stable condition of the control system for the right drive motor (balancing point); and $C_L(0)$ is the offset value for the stable condition of the control system for the left drive motor (balancing point).

The rotational speeds $V_R$ and $V_L$ for the right and left drive motors 11 and 12 in relation to inputs thereto are given by the following functions:

$$V_R=f(B_R+P_R+I_R)$$

$$V_L=f(B_L+P_L+I_L)$$

The steering control variable P necessary to correct the traveling course so as to bring the center line of the automatic guided vehicle 3 in alignment with the center line of the prearranged travel path is expressed by the following function:

$$P = f(V_R \pm V_{RX}, V_L \pm V_{LX})$$

The rotational speeds $V_{SR}$ and $V_{SL}$ for the right and left drive motors 11 and 12 in relation to inputs thereto when the automatic guided vehicle 3 can travel stably with the center lines of the automatic guided vehicle 3 and the path guide tape 2A in alignment with each other are given by the following functions:

$$V_{SR} = f(B_{RS} + C_R(0))$$

$$V_{SL} = f(B_{LS} + C_L(0))$$

where $B_{RS}$ is the feedforward control variable for providing a balancing point for the control system in relation to the right drive motor; and $B_{LS}$ is the feedforward control variable for providing a balancing point for the control system in relation to the left drive motor.

In conclusion, the input $V_{SR}$, $V_{SL}$ to the drive motor for providing a balancing point for the control system is the sum of the feedforward control variable $B_{RS}$, $B_{RS}$ and the offset value $C_R(0)$, $C_L(0)$. In this connection, the input $V_{SR}$, $V_{SL}$ to the drive motor for providing a balancing point for the control system which is not equipped with the feedforward circuit 80, 81 is depends on the offset value $C_R(0)$, $C_L(0)$ at the integral control circuit 69, 70 only as will be apparent from the following function:

$$V_{SR} = f(C_R(0))$$

$$V_{SL} = f(C_L(0))$$

The control system which is not equipped with the feedforward circuit 60, 61, the balancing point for the up-dated speed of the motor drive circuit 15, 16 depends upon the offset value at the integral control circuit 69, 70 only, and consequently it is necessary to spend a time corresponding to the integral time constant TI until the motor drive circuit 15, 16 reaches an up-dated balancing point. As a result, the control system is placed under unstable operating conditions for the integration time, which always causes unsteady sway motion of the automatic guided vehicle. However, with the control system equipped with the feedforward control circuit 80, 81, because the offset value immediately before speed changing is added by the feedforward control variable corresponding to the up-dated speed, the offset value at the integral control section 69, 70 needs only the smallest correction, and hence the integration time necessary to provide the balancing point becomes shortest. As a result, a time for which the control system is placed under unstable operating conditions becomes shorter during up-dating the travel speed, preventing the automatic guided vehicle 3 from encountering with right and left sway motion.

Although the invention has been fully described by way of specific examples with reference to the accompanying drawings, it is to be understood that various changes and modifications mat occur to those skilled in the art. Unless such changes and modifications otherwise depart from the scope of the invention, they are intended to be covered by the following claims.

What is claimed is:

1. A vehicle control system for controlling a motor driven vehicle having right and left drive wheels arranged transversely side by side which is guided by path guide means to travel on a prearranged path established by said path guide means, said vehicle control system comprising:

steering means installed on said motor driven vehicle for steering said motor driven vehicle with a controlled steering variable to change a travel direction of said motor drive vehicle, said steering means comprising a steering disk supported for rotation by said motor driven vehicle and wheel drive means installed on said steering disk for independently driving said right and left drive wheels;

guide monitoring means installed on said motor driven vehicle for monitoring a lateral deviation of said motor driven vehicle from said path guide means; and control means for controlling said wheel drive means by a prescribed relationship between said controlled steering variable and said lateral deviation to drive said drive wheels at different travel speeds according to said controlled steering variable such that a speed difference between said different travel speed for a specific lateral deviation becomes smaller than an increase in said travel speed of said motor driven vehicle so as thereby to control said motor driven vehicle in travel direction.

2. The vehicle control system as defined in claim 1, wherein said control means includes a memory storing a map of said prescribed relationship.

3. The vehicle control system as defined in claim 1, wherein said control means controls said steering means by a plurality of said prescribed relationships used accordingly to travel speeds of said motor driven vehicle, respectively.

4. The vehicle control system as defined in claim 3, wherein said maps include at least one which is used during acceleration of said motor driven vehicle and another one which is used during deceleration of said motor driven vehicle.

5. The vehicle control system as defined in claim 3, wherein said maps include at least one which is used during forward travel of said motor driven vehicle and another one which is used during backward travel of said motor driven vehicle.

6. The vehicle control system as defined in claim 4, wherein said map used during acceleration of said motor driven vehicle sets said controlled steering variable to a larger value in a smallest range of said lateral deviations than in other ranges of said lateral deviations, and said map used during deceleration of said motor driven vehicle sets said controlled steering variable to a smaller value in said smallest range of said lateral deviations than in said other ranges of said lateral deviations.

7. The vehicle control system as defined in claim 1, wherein said control means includes a memory storing maps of said prescribed relationship differently established.

8. The vehicle control system as defined in claim 7, and further comprising travel instruction means disposed along said path guide means for providing travel instructions relating at least to travel speeds of said motor driven vehicle, and travel instruction monitoring means installed on said motor driven vehicle for monitoring said travel instructions by which a travel speed of said motor driven vehicle is controlled, wherein said control means selects one out of said maps of said prescribed relationships according to said travel speeds.

9. A vehicle control system for controlling a motor driven vehicle having right and left drive wheels arranged transversely side by side which is guided by path guide means to travel on a prearranged path established by said path guide means, said vehicle control system comprising:

steering means installed on said motor drive vehicle for steering said motor driven vehicle with a controlled steering variable to change a travel direction of said motor drive vehicle;

guide monitoring means installed on said motor drive vehicle for monitoring a lateral deviation of said motor driven vehicle from said path guide means;

wheel drive motors for driving said right and left drive wheels, respectively; travel speed instruction means located along said prearranged path for providing travel speed instructions for said motor driven vehicle;

instruction monitoring means installed on said motor driven vehicle for monitoring said travel speed instructions on said speed instruction means; and control means for controlling said steering means by a prescribed relationship between said controlled steering variable and said lateral deviation to steer said motor driven vehicle so as thereby to control said motor driven vehicle in travel direction and controlling said drive motor with a control parameter to drive said drive wheels, said control means changing said control parameter so as to gradually change a traveling speed of said motor driven vehicle according to said travel speed instruction.

10. The vehicle control system as defined in claim 9, wherein said control means comprises a speed control circuit for controlling said travel speed of said motor driven vehicle, a steering control circuit for controlling said steering means to control travel of said motor driven vehicle along said path guide means, a proportional control circuit for providing said controlled variable proportional to a target vehicle travel speed, a motor drive circuit for driving said drive motor, a feedback control circuit for detecting a rotational speed of said drive motor and providing a feedback signal for said proportional control circuit, and a feedforward control circuit disposed between an output end of said steering control circuit and a point between an output end of said proportional control circuit and an input end of said motor drive circuit for compensating disturbance.

11. The vehicle control system as defined in claim 9, wherein said control means changes said control parameter based on a change rate of said proportional controlled valuable.

12. The vehicle control system as defined in claim 9, wherein said control means includes a memory storing maps of a plurality steps of travel speeds into which said instructed travel speeds are divided.

13. The vehicle control system as defined in claim 9, wherein said steering means comprises said drive motors and said control means controls said drive motor so as to drive said drive wheels at different speeds according to controlled steering variable, thereby steering said motor driven vehicle.

14. The vehicle control system as defined in claim 13, wherein said control means has a dead zone for a specified range of lateral deviations.

15. A vehicle control system for controlling a motor driven vehicle which is guided by path guide means to travel on a prearranged path established by said path guide means, said vehicle control system comprising:

steering means installed on said vehicle for steering said single drive wheel with a controlled steering variable to change a travel direction of said motor driven vehicle, said steering means comprising a steering disk supported for rotation by said motor driven vehicle, wheel drive means installed on said steering disk for driving a single drive wheel of said motor driven vehicle and steering disk drive means secured to said motor driven vehicle for driving said steering disk;

guide monitoring means installed on said motor driven vehicle for monitoring a lateral deviation of said motor driven vehicle from said path guide means; and control means for controlling said steering disk drive means to drive said steering disk through an angle according to a prescribed relationship between said controlled steering variable and said lateral deviation so as to steer said motor driven vehicle, thereby controlling said motor driven vehicle in travel direction, said control means including a memory storing maps of said prescribed relationships differently established and selectively using said maps according to travel speeds of said motor driven vehicle to control travel of said motor driven vehicle.

16. A vehicle control system for controlling a motor driven vehicle having a right and left drive wheels arranged transversely side by side, respectively which is guided by path guide means to travel on a prearranged path established by said path guide means, said vehicle control system comprising:

steering means installed on said motor driven vehicle for steering said motor driven vehicle with a controlled steering variable to change a travel direction of said motor drive vehicle;

guide monitoring means installed on said motor driven vehicle for monitoring a lateral deviation of said motor driven vehicle from said path guide means;

wheel drive motors for driving said right and left drive wheels;

travel speed instruction means located along said prearranged path for providing travel speed instructions for said motor driven vehicle;

instruction monitoring means installed on said motor driven vehicle for monitoring said travel speed instructions on said speed instruction means; and control means for controlling said wheel drive motors by a prescribed relationship between said controlled steering variable and said lateral deviation to steer said motor driven vehicle so as thereby to control said motor driven vehicle in travel direction and controlling said wheel drive motors with said travel speed instruction to drive said drive wheels.

17. The vehicle control system as defined in claim 16, wherein said steering means comprises a steering disk supported for rotation by said motor driven vehicle and wheel drive means installed on said steering disk for independently driving said right and left drive wheels, and said control means controls said wheel drive means to drive said drive wheels at different speeds according to said controlled steering variable so as thereby to steer said motor drive vehicle.

18. A vehicle control system for controlling a motor driven vehicle having a single drive wheel which is guided by path guide means to travel on a prearranged path established by said path guide means, said vehicle control system comprising:

steering means installed on said motor driven vehicle for steering said motor driven vehicle with a controlled steering variable to change a travel direction of said motor drive vehicle;

guide monitoring means installed on said motor driven vehicle for monitoring a lateral deviation of said motor driven vehicle from said path guide means;

a wheel drive motor for driving said drive wheel;

travel speed instruction means located along said prearranged path for providing travel speed instructions for said motor driven vehicle;

instruction monitoring means installed on said motor driven vehicle for monitoring said travel speed instructions on said speed instruction means; and control means for controlling said steering means by a prescribed relationship between said controlled steering variable and said lateral deviation to steer said motor driven vehicle so as thereby to control said motor driven vehicle in travel direction and controlling said drive motor with said travel speed instruction to drive said drive wheels.

19. A vehicle control system as defined in claim 18, wherein said steering means comprises a steering disk supported for rotation by said motor driven vehicle and a steering disk drive means secured to said motor driven vehicle for driving said steering disk, and said control means controls said steering disk drive means to drive said steering disk through an angle according to said controlled steering variable.

20. A vehicle control system as defined in claim 18, wherein said control means includes a memory storing maps of said prescribed relationships differently established and selectively uses said maps according to travel steeds of said motor driven vehicle to control said steering means.

* * * * *